(12) United States Patent
Murakami et al.

(10) Patent No.: US 10,512,145 B2
(45) Date of Patent: Dec. 17, 2019

(54) LIGHTING SYSTEM AND WIRELESS RELAY METHOD THEREOF

(71) Applicant: PANASONIC INTELLECTUAL PROPERTY MANAGEMENT CO., LTD., Osaka (JP)

(72) Inventors: Kaoru Murakami, Osaka (JP); Shigeo Nakamura, Osaka (JP); Tomokazu Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/393,694

(22) Filed: Apr. 24, 2019

(65) Prior Publication Data
US 2019/0335568 A1    Oct. 31, 2019

(30) Foreign Application Priority Data
Apr. 26, 2018    (JP) ................. 2018-084929

(51) Int. Cl.
| H05B 37/02 | (2006.01) |
| H05B 33/08 | (2006.01) |
| H04W 88/06 | (2009.01) |
| H04W 84/12 | (2009.01) |
| H04W 4/80 | (2018.01) |

(52) U.S. Cl.
CPC ..... H05B 37/0272 (2013.01); H05B 33/0842 (2013.01); H04W 4/80 (2018.02); H04W 84/12 (2013.01); H04W 88/06 (2013.01)

(58) Field of Classification Search
CPC ............... H05B 37/02; H05B 37/0272; H05B 37/0245; H05B 33/0863; H04B 17/318; H04B 17/0085; H04W 52/245; H04W 28/18; H04W 88/04; H04W 8/26
See application file for complete search history.

(56) References Cited

U.S. PATENT DOCUMENTS

| 6,710,546 B2 * | 3/2004 | Crenshaw | ............... H02J 9/02 315/150 |
| 6,828,733 B1 * | 12/2004 | Crenshaw | ............... H02J 9/02 315/150 |

(Continued)

FOREIGN PATENT DOCUMENTS

JP    2006-140764 A    6/2006

*Primary Examiner* — Haissa Philogene
(74) *Attorney, Agent, or Firm* — McDermott Will & Emery LLP

(57) ABSTRACT

A second communication unit of a wireless controller transmits a first signal to luminaires, the first signal instructing the luminaires to respond to a request from the wireless controller. A control unit (i) receives a response to the first signal sent from the luminaires, (ii) when there is a first group including a luminaire that has responded to the first signal, and a second group including at least one luminaire that has not responded to the first signal, assigns the luminaire in the first group as a relay luminaire, and (iii) transmit a second signal to the relay luminaire, the second signal instructing the relay luminaire to wirelessly communicate with the at least one luminaire in the second group via the second communication unit. The relay luminaire that has received the second signal wirelessly communicates with the at least one luminaire in the second group via a first communication unit.

20 Claims, 22 Drawing Sheets

(56) References Cited

U.S. PATENT DOCUMENTS

| | | | | |
|---|---|---|---|---|
| 8,742,694 B2* | 6/2014 | Bora | ............. | H05B 33/0863 |
| | | | | 315/307 |
| 9,801,261 B2* | 10/2017 | Lurie | ............. | H05B 37/0245 |
| 10,411,815 B2* | 9/2019 | Nakamura | ............. | H04B 17/17 |
| 2019/0053356 A1* | 2/2019 | Hiramatsu | ............. | H05B 37/0272 |
| 2019/0230771 A1* | 7/2019 | Hoshi | ............. | G05B 19/042 |

* cited by examiner

FIG. 3

| | IDENTIFICATION INFORMATION | LAYOUT INFORMATION (x, y, z) | RESPONSE Y/N | RELAY Y/N | RELAY-DESTINATION LUMINAIRES | NO. OF RELAYS | WIRELESS COMMUNICATION r1 | | WIRELESS COMMUNICATION r2 | |
|---|---|---|---|---|---|---|---|---|---|---|
| | | | | | | | COMMUNICATION QUALITY | SIGNAL STRENGTH | COMMUNICATION QUALITY | SIGNAL STRENGTH |
| WIRELESS CONTROLLER | ID20 | 10, 25, 100 | - | - | - | - | - | - | - | - |
| LUMINAIRE 1 | ID01 | 50, 10, 100 | Y | N | - | - | GOOD | 4 | - | - |
| LUMINAIRE 2 | ID02 | 50, 20, 100 | Y | Y | 5, 6, 7, 8 | 4 | GOOD | 5 | - | - |
| LUMINAIRE 3 | ID03 | 50, 30, 100 | Y | N | - | - | GOOD | 5 | - | - |
| LUMINAIRE 4 | ID04 | 50, 40, 100 | Y | N | - | - | GOOD | 4 | - | - |
| LUMINAIRE 5 | ID05 | 90, 10, 100 | N | N | - | - | POOR | - | GOOD | 4 |
| LUMINAIRE 6 | ID06 | 90, 20, 100 | N | N | - | - | POOR | - | GOOD | 5 |
| LUMINAIRE 7 | ID07 | 90, 30, 100 | N | N | - | - | POOR | - | GOOD | 5 |
| LUMINAIRE 8 | ID08 | 90, 40, 100 | N | N | - | - | POOR | - | GOOD | 4 |

| LUMINAIRE 2 | | | | |
|---|---|---|---|---|
| IDENTIFICATION INFORMATION | IDENTIFICATION INFORMATION OF WIRELESS CONTROLLER | RELAY Y/N | RELAY-DESTINATION LUMINAIRES | NO. OF RELAYS |
| ID02 | ID20 | Y | 5, 6, 7, 8 | 4 |

FIG. 7A

| | IDENTIFICATION INFORMATION | LAYOUT INFORMATION (x, y, z) | RESPONSE Y/N | RELAY Y/N | RELAY-DESTINATION LUMINAIRES | NO. OF RELAYS | WIRELESS COMMUNICATION r1 | | WIRELESS COMMUNICATION r2 | |
|---|---|---|---|---|---|---|---|---|---|---|
| | | | | | | | COMMUNICATION QUALITY | SIGNAL STRENGTH | COMMUNICATION QUALITY | SIGNAL STRENGTH |
| WIRELESS CONTROLLER | ID20 | 10, 25, 100 | | | | | | | | |
| LUMINAIRE 1 | ID01 | 50, 10, 100 | | | | | | | | |
| LUMINAIRE 2 | ID02 | 50, 20, 100 | | | | | | | | |
| LUMINAIRE 3 | ID03 | 50, 30, 100 | | | | | | | | |
| LUMINAIRE 4 | ID04 | 50, 40, 100 | | | | | | | | |
| LUMINAIRE 5 | ID05 | 90, 10, 100 | | | | | | | | |
| LUMINAIRE 6 | ID06 | 90, 20, 100 | | | | | | | | |
| LUMINAIRE 7 | ID07 | 90, 30, 100 | | | | | | | | |
| LUMINAIRE 8 | ID08 | 90, 40, 100 | | | | | | | | |

| | IDENTIFICATION INFORMATION | LAYOUT INFORMATION (x, y, z) | RESPONSE Y/N | RELAY Y/N | RELAY-DESTINATION LUMINAIRES | NO. OF RELAYS | WIRELESS COMMUNICATION r1 | | | WIRELESS COMMUNICATION r2 | |
|---|---|---|---|---|---|---|---|---|---|---|---|
| | | | | | | | COMMUNICATION QUALITY | SIGNAL STRENGTH | COMMUNICATION QUALITY | SIGNAL STRENGTH | |
| WIRELESS CONTROLLER | ID20 | 10, 25, 100 | - | - | | - | - | - | | |
| LUMINAIRE 1 | ID01 | 50, 10, 100 | Y | N | - | - | GOOD | 4 | | |
| LUMINAIRE 2 | ID02 | 50, 20, 100 | Y | Y | 5, 6, 7, 8 | 4 | GOOD | 5 | | |
| LUMINAIRE 3 | ID03 | 50, 30, 100 | Y | N | - | - | GOOD | 5 | | |
| LUMINAIRE 4 | ID04 | 50, 40, 100 | Y | N | - | - | GOOD | 4 | | |
| LUMINAIRE 5 | ID05 | 90, 10, 100 | N | N | - | - | POOR | - | | |
| LUMINAIRE 6 | ID06 | 90, 20, 100 | N | N | - | - | POOR | - | | |
| LUMINAIRE 7 | ID07 | 90, 30, 100 | N | N | - | - | POOR | - | | |
| LUMINAIRE 8 | ID08 | 90, 40, 100 | N | N | - | - | POOR | - | | |

FIG. 7C

| | IDENTIFICATION INFORMATION | LAYOUT INFORMATION (x, y, z) | RESPONSE Y/N | RELAY Y/N | RELAY-DESTINATION LUMINAIRES | NO. OF RELAYS | WIRELESS COMMUNICATION r1 | | WIRELESS COMMUNICATION r2 | |
|---|---|---|---|---|---|---|---|---|---|---|
| | | | | | | | COMMUNICATION QUALITY | SIGNAL STRENGTH | COMMUNICATION QUALITY | SIGNAL STRENGTH |
| WIRELESS CONTROLLER | ID20 | 10, 25, 100 | - | - | - | - | - | - | - | - |
| LUMINAIRE 1 | ID01 | 50, 10, 100 | Y | N | - | - | GOOD | 4 | - | - |
| LUMINAIRE 2 | ID02 | 50, 20, 100 | Y | Y | 5, 6, 7, 8 | 4 | GOOD | 5 | - | - |
| LUMINAIRE 3 | ID03 | 50, 30, 100 | Y | N | - | - | GOOD | 5 | - | - |
| LUMINAIRE 4 | ID04 | 50, 40, 100 | Y | N | - | - | GOOD | 4 | - | - |
| LUMINAIRE 5 | ID05 | 90, 10, 100 | N | N | - | - | POOR | - | GOOD | 4 |
| LUMINAIRE 6 | ID06 | 90, 20, 100 | N | N | - | - | POOR | - | GOOD | 5 |
| LUMINAIRE 7 | ID07 | 90, 30, 100 | N | N | - | - | POOR | - | GOOD | 5 |
| LUMINAIRE 8 | ID08 | 90, 40, 100 | N | N | - | - | POOR | - | GOOD | 4 |

| | IDENTIFICATION INFORMATION | LAYOUT INFORMATION (x, y, z) | RESPONSE Y/N | RELAY Y/N | RELAY-DESTINATION LUMINAIRES | NO. OF RELAYS | WIRELESS COMMUNICATION r1 | | WIRELESS COMMUNICATION r2 | |
|---|---|---|---|---|---|---|---|---|---|---|
| | | | | | | | COMMUNICATION QUALITY | SIGNAL STRENGTH | COMMUNICATION QUALITY | SIGNAL STRENGTH |
| WIRELESS CONTROLLER | ID20 | 10, 25, 100 | | | | | | | | |
| LUMINAIRE 1 | ID01 | 50, 10, 100 | | | | | | | | |
| LUMINAIRE 2 | ID02 | 50, 20, 100 | | | | | | | | |
| LUMINAIRE 3 | ID03 | 50, 30, 100 | | | | | | | | |
| LUMINAIRE 4 | ID04 | 50, 40, 100 | | | | | | | | |
| LUMINAIRE 5 | ID05 | 90, 10, 100 | | | | | | | | |
| LUMINAIRE 6 | ID06 | 90, 20, 100 | | | | | | | | |
| LUMINAIRE 7 | ID07 | 90, 30, 100 | | | | | | | | |
| LUMINAIRE 8 | ID08 | 90, 40, 100 | | | | | | | | |
| OBSTRUCTION | | 65 – 75, 0 – 15, 0 – 100 | | | | | | | | |

FIG. 11B

| | IDENTIFICATION INFORMATION | LAYOUT INFORMATION (x, y, z) | RESPONSE Y/N | RELAY Y/N | RELAY-DESTINATION LUMINAIRES | NO. OF RELAYS | WIRELESS COMMUNICATION r1 COMMUNICATION QUALITY | WIRELESS COMMUNICATION r1 SIGNAL STRENGTH | WIRELESS COMMUNICATION r2 COMMUNICATION QUALITY | WIRELESS COMMUNICATION r2 SIGNAL STRENGTH |
|---|---|---|---|---|---|---|---|---|---|---|
| WIRELESS CONTROLLER | ID20 | 10, 25, 100 | - | - | - | - | - | - | - | - |
| LUMINAIRE 1 | ID01 | 50, 10, 100 | Y | N | - | - | GOOD | 4 | - | - |
| LUMINAIRE 2 | ID02 | 50, 20, 100 | Y | N | - | - | GOOD | 5 | - | - |
| LUMINAIRE 3 | ID03 | 50, 30, 100 | Y | Y | 5, 6, 7, 8 | 4 | GOOD | 5 | - | - |
| LUMINAIRE 4 | ID04 | 50, 40, 100 | Y | N | - | - | GOOD | 4 | - | - |
| LUMINAIRE 5 | ID05 | 90, 10, 100 | N | N | - | - | POOR | - | GOOD | 4 |
| LUMINAIRE 6 | ID06 | 90, 20, 100 | N | N | - | - | POOR | - | GOOD | 5 |
| LUMINAIRE 7 | ID07 | 90, 30, 100 | N | N | - | - | POOR | - | GOOD | 5 |
| LUMINAIRE 8 | ID08 | 90, 40, 100 | N | N | - | - | POOR | - | GOOD | 4 |
| OBSTRUCTION | | 65 – 75, 0 – 15, 0 – 100 | | | | | | | | |

FIG. 15A

| | IDENTIFICATION INFORMATION | LAYOUT INFORMATION (x, y, z) | RESPONSE Y/N | RELAY Y/N | RELAY-DESTINATION LUMINAIRES | NO. OF RELAYS | WIRELESS COMMUNICATION r1 | | WIRELESS COMMUNICATION r2 | | POWER SWITCH 41 | POWER SWITCH 42 |
|---|---|---|---|---|---|---|---|---|---|---|---|---|
| | | | | | | | COMMUNICATION QUALITY | SIGNAL STRENGTH | COMMUNICATION QUALITY | SIGNAL STRENGTH | | |
| WIRELESS CONTROLLER | ID20 | 10, 25, 100 | | | | | | | | | - | - |
| LUMINAIRE 1 | ID01 | 50, 10, 100 | | | | | | | | | OFF | - |
| LUMINAIRE 2 | ID02 | 50, 20, 100 | | | | | | | | | OFF | - |
| LUMINAIRE 3 | ID03 | 50, 30, 100 | | | | | | | | | - | ON |
| LUMINAIRE 4 | ID04 | 50, 40, 100 | | | | | | | | | - | ON |
| LUMINAIRE 5 | ID05 | 90, 10, 100 | | | | | | | | | OFF | - |
| LUMINAIRE 6 | ID06 | 90, 20, 100 | | | | | | | | | OFF | - |
| LUMINAIRE 7 | ID07 | 90, 30, 100 | | | | | | | | | - | ON |
| LUMINAIRE 8 | ID08 | 90, 40, 100 | | | | | | | | | - | ON |

|  | IDENTIFICATION INFORMATION | LAYOUT INFORMATION (x, y, z) | RESPONSE Y/N | RELAY Y/N | RELAY-DESTINATION LUMINAIRES | NO. OF RELAYS | WIRELESS COMMUNICATION r1 ||| WIRELESS COMMUNICATION r2 || POWER SWITCH 41 | POWER SWITCH 42 |
|---|---|---|---|---|---|---|---|---|---|---|---|---|---|
|  |  |  |  |  |  |  | COMMUNICATION QUALITY | SIGNAL STRENGTH |  | COMMUNICATION QUALITY | SIGNAL STRENGTH |  |  |
| WIRELESS CONTROLLER | ID20 | 10, 25, 100 | - | - | - | - | - | - |  | - | - | - | - |
| LUMINAIRE 1 | ID01 | 50, 10, 100 | - | - | - | - |  |  |  |  |  | OFF | - |
| LUMINAIRE 2 | ID02 | 50, 20, 100 | - | - | - | - |  |  |  |  |  | OFF | - |
| LUMINAIRE 3 | ID03 | 50, 30, 100 | Y | Y | 7, 8 | 2 | GOOD | 5 |  |  |  | - | ON |
| LUMINAIRE 4 | ID04 | 50, 40, 100 | Y | N | - | - | GOOD | 4 |  |  |  | - | ON |
| LUMINAIRE 5 | ID05 | 90, 10, 100 | - | - | - | - |  |  |  |  |  | OFF | - |
| LUMINAIRE 6 | ID06 | 90, 20, 100 | - | - | - | - |  |  |  |  |  | OFF | - |
| LUMINAIRE 7 | ID07 | 90, 30, 100 | N | N | - | - | POOR | - |  | GOOD | 5 | - | ON |
| LUMINAIRE 8 | ID08 | 90, 40, 100 | N | N | - | - | POOR | - |  | GOOD | 4 | - | ON |

20e

LIGHTING SYSTEM AND WIRELESS RELAY METHOD THEREOF

CROSS REFERENCE TO RELATED APPLICATION

This application claims the benefit of priority of Japanese Patent Application Number 2018-084929 filed on Apr. 26, 2018, the entire content of which is hereby incorporated by reference.

BACKGROUND

1. Technical Field

The present disclosure relates to a lighting system including a luminaire and a wireless controller, and to a wireless relay method of the lighting system.

2. Description of the Related Art

Conventionally, a lighting system including luminaires and a wireless controller that controls the luminaires is known (e.g. see Japanese Unexamined Patent Application Publication No. 2006-140764). For this type of lighting system, wireless communication between the luminaires and the wireless controller is set up after the luminaires and the wireless controller have been installed in a building.

For the lighting system described in Japanese Unexamined Patent Application Publication No. 2006-140764, for example, another luminaire disposed between the wireless controller and a predetermined luminaire is configured as a relay luminaire when the predetermined luminaire is set up far away from the wireless controller, and the luminaires and the wireless controller wirelessly communicate. However, the above wireless communication may become impossible due to a change in an electromagnetic wave environment (EME) after the wireless communication has been set up, and a change in layout due to, for example, partitions being set up or the introduction of new materials. In such a case, it is possible to restore the wireless communication by reconfiguring a different luminaire as the relay luminaire, but reconfiguring the relay luminaire is cumbersome to the user and requires much effort.

Accordingly, the present disclosure aims to provide a lighting system that makes it possible to easily assign a relay luminaire and the like whenever the luminaires and the wireless controller wirelessly communicate.

SUMMARY

An aspect of a lighting system in the present disclosure includes a first luminaire, a second luminaire, and a wireless controller. The first luminaire and the second luminaire each include a first communication unit configured to communicate with the wireless controller, and the first luminaire and the second luminaire communicate with each other via the first communication units each being the first communication unit. The wireless controller includes a second communication unit configured to communicate with the first luminaire and the second luminaire, and a control unit configured to control the first luminaire and the second luminaire via the second communication unit. The second communication unit is configured to transmit a first signal to the first luminaire and the second luminaire, the first signal instructing the first luminaire and the second luminaire to respond to a request from the wireless controller. The control unit is configured to, when the first luminaire responds to the first signal and the second luminaire does not respond to the first signal, assign the first luminaire as a relay luminaire and transmit a second signal to the first luminaire, the second signal instructing the first luminaire to wirelessly communicate with the second luminaire via the second communication unit. The first luminaire that has received the second signal wirelessly communicates with the second luminaire via the first communication unit.

An aspect of a lighting system in the present disclosure includes a plurality of luminaires and a wireless controller. The plurality of luminaires each include a first communication unit configured to communicate with the wireless controller, and the plurality of luminaires communicate with each other via the first communication units each being the first communication unit. The wireless controller includes a second communication unit configured to communicate with the plurality of luminaires, and a control unit configured to control the plurality of luminaires via the second communication unit. The second communication unit is configured to transmit a first signal to the plurality of luminaires, the first signal instructing the plurality of luminaires to respond to a request from the wireless controller. The control unit is configured to (i) receive a response to the first signal sent from at least one luminaire of the plurality of luminaires, (ii) when there is a first group including the at least one luminaire that has responded to the first signal, and a second group including at least one luminaire that has not responded to the first signal, assign the at least one luminaire in the first group as a relay luminaire, and (iii) transmit a second signal to the relay luminaire, the second signal instructing the relay luminaire to wirelessly communicate with the at least one luminaire in the second group via the second communication unit. The relay luminaire that has received the second signal wirelessly communicates with the at least one luminaire in the second group via the first communication unit.

An aspect of a lighting system in the present disclosure includes a plurality of luminaires and a wireless controller. The plurality of luminaires each include a first communication unit configured to communicate with the wireless controller, and the plurality of luminaires communicate with each other via the first communication units each being the first communication unit. The wireless controller includes a second communication unit configured to communicate with the plurality of luminaires and a control unit configured to control the plurality of luminaires via the second communication unit. The plurality of luminaires include a relay luminaire that relays wireless communication of the wireless controller, and a relay-destination luminaire that wirelessly communicates with the wireless controller via the relay luminaire. The control unit is configured to (i) transmit a third signal to the relay luminaire via the second communication unit, the third signal instructing the relay luminaire to respond to a request from the wireless controller, (ii) when the relay luminaire does not respond to the third signal, assign at least one luminaire as a substitute relay luminaire of the relay luminaire, and (iii) transmit a fourth signal to the substitute relay luminaire via the second communication unit, the fourth signal instructing the substitute relay luminaire to wirelessly communicate with the relay-destination luminaire. The substitute relay luminaire that has received the fourth signal wirelessly communicates with the relay-destination luminaire via the first communication unit.

An aspect of a wireless relay method of a lighting system in the present disclosure including a plurality of luminaires and a wireless controller that communicates with the plurality of luminaires, in which at least one relay luminaire is assigned from the plurality of luminaires, and the plurality of luminaires and the wireless controller wirelessly communicate with one another, the method including transmitting a first signal to the plurality of luminaires, the first signal instructing the plurality of luminaires to respond to a request from the wireless controller; (i) receiving a response to the first signal sent from at least one luminaire of the plurality of luminaires, (ii) when there is a first group including a luminaire of the plurality of luminaires that has responded to the first signal, and a second group including a luminaire that has not responded to the first signal, assigning the luminaire in the first group as the at least one relay luminaire, and (iii) transmitting a second signal to the at least one relay luminaire, the second signal instructing the at least one relay luminaire to wirelessly communicate with the at least one luminaire in the second group; and wirelessly communicating between the at least one relay luminaire that has received the second signal and the at least one luminaire in the second group. An aspect of a lighting system includes a plurality of luminaires and a wireless controller. The wireless controller is configured to (i) transmit a first signal to the plurality of luminaires, the first signal instructing the plurality of luminaires to respond to the first signal, (i) receive a response to the first signal sent from at least one luminaire among the plurality of luminaires; and (iii) when the at least one luminaire that has responded to the first signal is in a first group and at least one luminaire that has not responded to the first signal is in a second group, assign the at least one luminaire in the first group as a relay luminaire by transmitting a second signal to the at least one luminaire in the first group. The at least one luminaire assigned as the relay luminaire by receiving the second signal is configured to (i) receive a command from the wireless controller via wireless communication and (ii) forward the command to the at least one luminaire in the second group via wireless communication.

The lighting system makes it possible to easily assign a relay luminaire whenever the luminaires and the wireless controller wirelessly communicate.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 3 is a diagram showing a storage table stored in a storage unit of the wireless controller according to Embodiment 1;

FIG. 4 is a diagram showing a storage table stored in a storage unit of a luminaire according to Embodiment 1;

FIG. 7A is a diagram showing an example of the storage table stored in the storage unit of the wireless controller according to Embodiment 1;

FIG. 7B is a diagram showing an example of the storage table stored in the storage unit of the wireless controller according to Embodiment 1;

FIG. 7C is a diagram showing an example of the storage table stored in the storage unit of the wireless controller according to Embodiment 1;

FIG. 11A is a diagram showing an example of a storage table stored in the storage unit of the wireless controller according to Embodiment 2;

FIG. 11B is a diagram showing an example of the storage table stored in the storage unit of the wireless controller according to Embodiment 2;

FIG. 15A is a diagram showing an example of a storage table stored in the storage unit of the wireless controller according to Embodiment 3;

FIG. 15B is a diagram showing an example of the storage table stored in the storage unit of the wireless controller according to Embodiment 3;

DETAILED DESCRIPTION OF THE EMBODIMENTS

Figure 1:
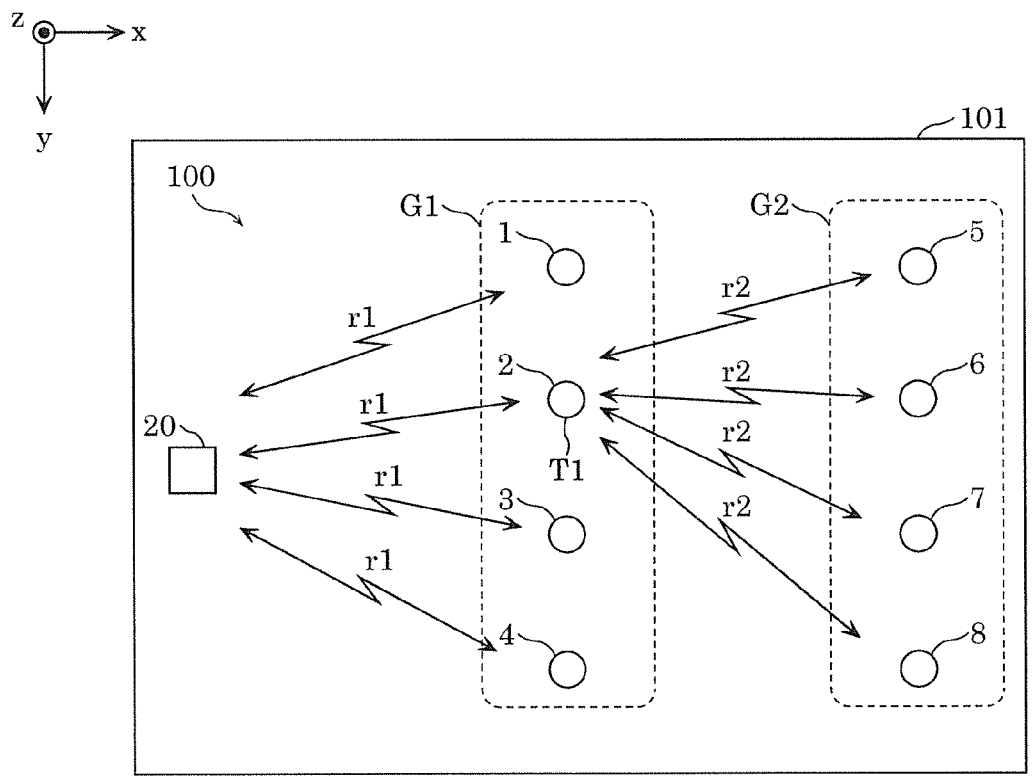
FIG. 1 is a schematic view of luminaires included in a lighting system and a wireless controller according to Embodiment 1 viewed from a ceiling of a building.

Hereinafter, a lighting system and the like according to embodiments will be described with reference to the drawings. Note that the embodiments described below each show a specific example in the present disclosure. Therefore, numerical values, shapes, materials, components, placements and connections of the components, and the like are mere examples and are not intended to limit the present disclosure. Components in the following embodiments not mentioned in any of the independent claims that define the broadest concepts are described as optional elements.

Note that the drawings are schematic diagrams and do not necessarily provide strictly accurate illustrations. In each drawing, components that are substantially the same as components described previous thereto have the same reference numerals and overlapping descriptions may be omitted or simplified.

Embodiment 1

1-1 Configuration of Lighting System

An overall configuration of lighting system 100 will be described first with reference to FIG. 1.

FIG. 1 is a schematic view of luminaires included in lighting system 100 and a wireless controller according to Embodiment 1 viewed from a ceiling of building 101. In the drawing, the z-axis is vertical, and the x- and y-axes are horizontal and perpendicular to each other.

Lighting system 100 includes luminaires 1, 2, 3, 4, 5, 6, 7, and 8; and wireless controller 20 that wirelessly communicates with at least one of luminaires 1-8. Note that in FIG. 1, the eight luminaires 1-8 are shown, but at least 100 luminaires may actually be disposed on a ceiling and the like of building 101.

There is a limit to how far the electromagnetic waves transmitted from wireless controller 20 can reach, and there will be luminaires that cannot directly communicate with wireless controller 20 when the luminaires are disposed too far away therefrom. In such a case, the wireless communication is performed by disposing relay luminaire T1 between wireless controller 20 and the above luminaires that cannot directly communicate with wireless controller 20.

A connection relationship of the wireless communication between luminaires 1-8 included in lighting system 100 and wireless controller 20 will be described with reference to FIG. 1. Note that in lighting system 100 in the present embodiment, the connection relationship of the wireless communication can be changed automatically in accordance with the changing EME and inner layout of building 101 over time, but the connection relationship of the wireless communication is shown in FIG. 1 at a specific time for facilitating understanding.

As illustrated in FIG. 1, out of luminaires 1-8, luminaires 1-4 are disposed proximate to wireless controller 20 and luminaires 5-8 are disposed farther from wireless controller 20. Luminaires 1-4 and wireless controller 20 are communicable through wireless communication r1. Luminaire 2 is configured as relay luminaire T1 and is communicable with luminaires 5-8 through wireless communication r2. In other words, luminaires 5-8 and wireless controller 20 are communicable via relay luminaire T1.

The communication method of wireless communications r1 and r2 uses low-power wireless technology operating in the 920 MHz band or 2.4 GHz band, e.g. Zigbee®, Bluetooth®, or Wi-Fi®.

A configuration of lighting system 100 will be described next with reference to FIGS. 1 to 4.

Figure 2:
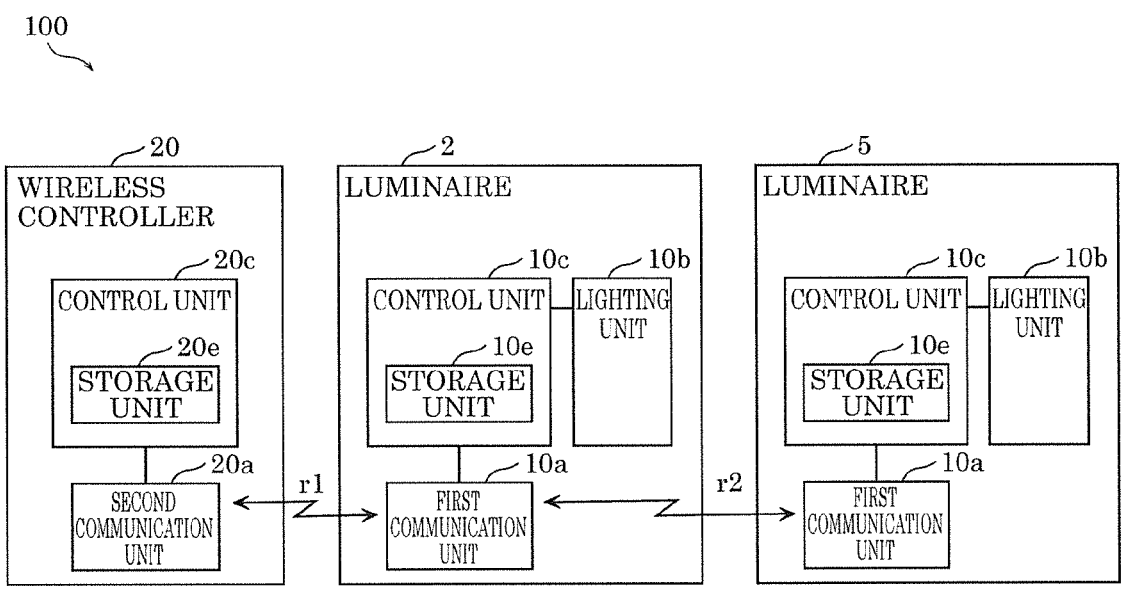
FIG. 2 is a block diagram showing a configuration of the lighting system according to Embodiment 1.

FIG. 2 is a block diagram showing the configuration of lighting system 100. Note that there are some instances below where luminaire 2 and luminaire 5 out of luminaires 1-8 are described as representative examples.

Wireless controller 20 controls luminaires 2 and 5. To be specific, wireless controller 20 performs a communication control and lighting control of luminaires 2 and 5. Wireless controller 20 includes second communication unit 20a that communicates with luminaires 2 and 5, and control unit 20c that is connected to second communication unit 20a.

Second communication unit 20a includes an antenna, wireless module, and the like. Second communication unit 20a communicates, for example, with luminaire 2 through wireless communication r1 and with luminaire 5 through wireless communication r2 via wireless communication r1 and luminaire 2.

Control unit 20c includes a central processing unit (CPU) and the like. Control unit 20c further includes storage unit 20e having random-access memory (RAM), read-only memory (ROM), and the like. Storage unit 20e stores a variety of information shown below.

FIG. 3 is a diagram showing a storage table stored in storage unit 20e of the wireless controller.

As illustrated in FIG. 3, storage unit 20e stores identification information about wireless controller 20 and identification information about luminaires 1-8. Note that the identification information may also be media access control (MAC) addresses of wireless controller 20 and luminaires 1-8.

Storage unit 20e contains intramural layout information about building 101 including placement information about wireless controller 20 and luminaires 1-8. For example, FIG. 3 shows, speaking in terms of the coordinates (x, y, z) inside building 101, wireless controller 20 disposed at position (10, 25, 100) and luminaire 2 disposed at position (50, 10, 100). Control unit 20c assigns relay luminaire T1 based on the layout information stored in storage unit 20e.

Note that the above storage table may also be stored in a storage unit of an external server connected to wireless controller 20.

Control unit 20c transmits first signal s1 to luminaires 1-8 via second communication unit 20a. Note that first signal s1 instructs luminaires 1-8 to respond to a request from wireless controller 20.

Storage unit 20e stores information relating to whether there has been a response from luminaires 1-8 to this first signal s1. For example, FIG. 1 shows luminaires 1-4 that have responded to first signal s1 as first group G1 and luminaires 5-8 that have not responded to first signal s1 as second group G2 sorted by control unit 20c.

Storage unit 20e stores information relating to an individual number of the luminaire configured as relay luminaire T1 (luminaire 2 in FIG. 1) and individual numbers of relay-destination luminaires (luminaires 5, 6, 7, and 8 in FIG. 1).

Storage unit 20e also stores a current number of relay luminaires T1 since there is a limit on the number of relay luminaires T1. Control unit 20c assigns relay luminaire T1 based on the current number of relayable luminaires that can communicate with other luminaires at the present time. For example, when there are eight relayable relay luminaires T1, control unit 20c assigns the luminaires as relay luminaires T1 and relay-destination luminaires such that there are no more than eight relayable luminaires.

Storage unit 20e also stores information relating to communication states of wireless communication r1 between wireless controller 20 and luminaires 1-8 and communication states of wireless communication r2 between relay luminaire T1 and the relay-destination luminaires 5-8. The information relating to these communication states is information about, for example, communication quality or received signal strength indicator (RSSI) indicating a signal strength of wireless communications r1 and r2. For example, the communication quality is indicated with "poor" when a luminaire has broken down. For example, the signal strength is evaluated on a scale from 1 to 5. Control unit 20c assigns relay luminaire T1 based on the communication state between wireless controller 20 and luminaires 1-4 of first group G1 saved in storage unit 20e.

Luminaires 2 and 5 are, for example, light-emitting diode (LED) lights. Luminaires 2 and 5 each include first communication unit 10a, lighting unit 10b, and control unit 10c connected to first communication unit 10a and lighting unit 10b.

First communication unit 10a includes an antenna and a wireless module. First communication unit 10a communicates with wireless controller 20 and allows luminaires 2 and 5 to communicate with each other. To be specific, first communication unit 10a of luminaire 2 communicates with wireless controller 20 through wireless communication r1 and with luminaire 5 through wireless communication r2. First communication unit 10a of luminaire 5 communicates with luminaire 2 through wireless communication r2.

Lighting unit 10b includes a plurality of light sources such as LEDs that emit, for example, white, red, green, or blue light.

Control unit 10c includes a CPU and the like. Control unit 10c controls a communication partner of first communication unit 10a and a lighting state of lighting unit 10b based on an instruction of wireless controller 20. Control unit 10c includes a measuring unit that measures the signal strength. Note that the measuring unit, which measures the signal strength, may also be disposed in control unit 20c of wireless controller 20.

Control unit 10c includes storage unit 10e having RAM, ROM, and the like. Storage unit 10e stores a variety of information described below.

FIG. 4 is a diagram showing a storage table stored in storage unit 10e of luminaire 2.

As illustrated in FIG. 4, storage unit 10e of luminaire 2 stores identification information about luminaire 2 and identification information about wireless controller 20 that is a communication partner of luminaire 5. Storage unit 10e also stores information about whether luminaire 2 is configured as relay luminaire T1 and information relating to the individual numbers of the relay-destination luminaires 5-8. Storage unit 10e stores the current number of relay luminaires T1 since there is a limit on the number of relay luminaires T1. However, storage unit 10e of relay-destination luminaire 5 stores identification information about luminaire 5 and identification information about luminaire 2 that is a communication partner of luminaire 5 (not illustrated).

In the present embodiment, relay luminaire T1 is assigned due to luminaires 1-8 and wireless controller 20 having the following configuration. Second communication unit 20a first transmits first signal s1 to luminaires 1-8, first signal s1 instructing luminaires 1-8 to respond to a request from wireless controller 20. Control unit 20c receives a response to first signal s1 sent from at least one luminaire of luminaires 1-8, e.g. luminaires 1-4.

When there is first group G1 including luminaires 1-4 of luminaires 1-8 that have responded to first signal s1, and second group G2 including, e.g. luminaires 5-8 that have not responded to first signal s1, control unit 20c (i) assigns at least one luminaire in first group G1, e.g. luminaire 2 as relay luminaire T1, and (ii) transmits second signal s2 to relay luminaire T1, second signal s2 instructing relay luminaire T1 to wireless communicate with at least one luminaire in second group G2, e.g. luminaires 5-8 via second communication unit 20a. Relay luminaire T1 that has received second signal s2 wirelessly communicates with luminaires 5-8 in second group G2 via first communication unit 10a.

This enables lighting system 100 to easily assign relay luminaire T1 whenever luminaires 1-8 and wireless controller 20 wirelessly communicate.

Control unit 20c receives communication states between relay luminaire T1 and luminaires 5-8 in second group G2 from relay luminaire T1, and maintains relay luminaire T1 as such when the communication states are within a specified range.

In this manner, relay luminaire T1 can be correctly assigned by confirming the communication states between relay luminaire T1 and luminaires 5-8 in second group G2.

1-2. Wireless Relay Method of Lighting System

A wireless relay method of lighting system 100 will be described next with reference to FIGS. 5 to 7C.

Figure 5:
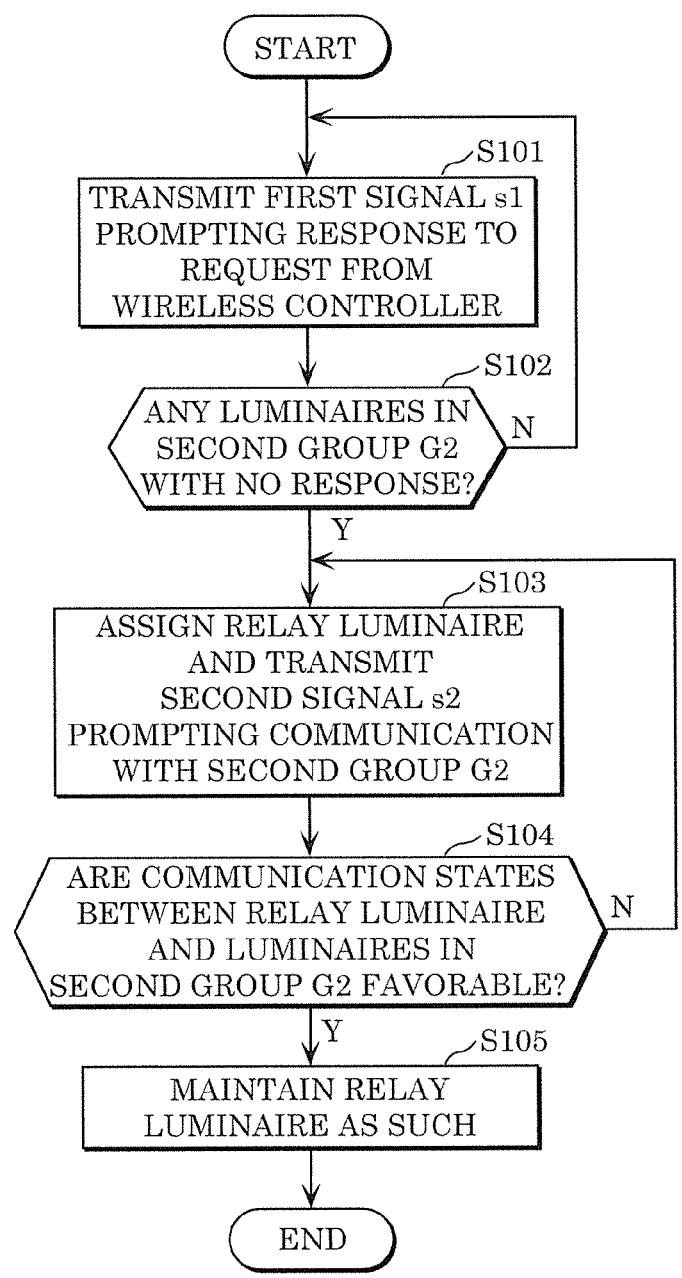
FIG. 5 is a flowchart of the wireless relay method of the lighting system according to Embodiment 1.
Figure 6:
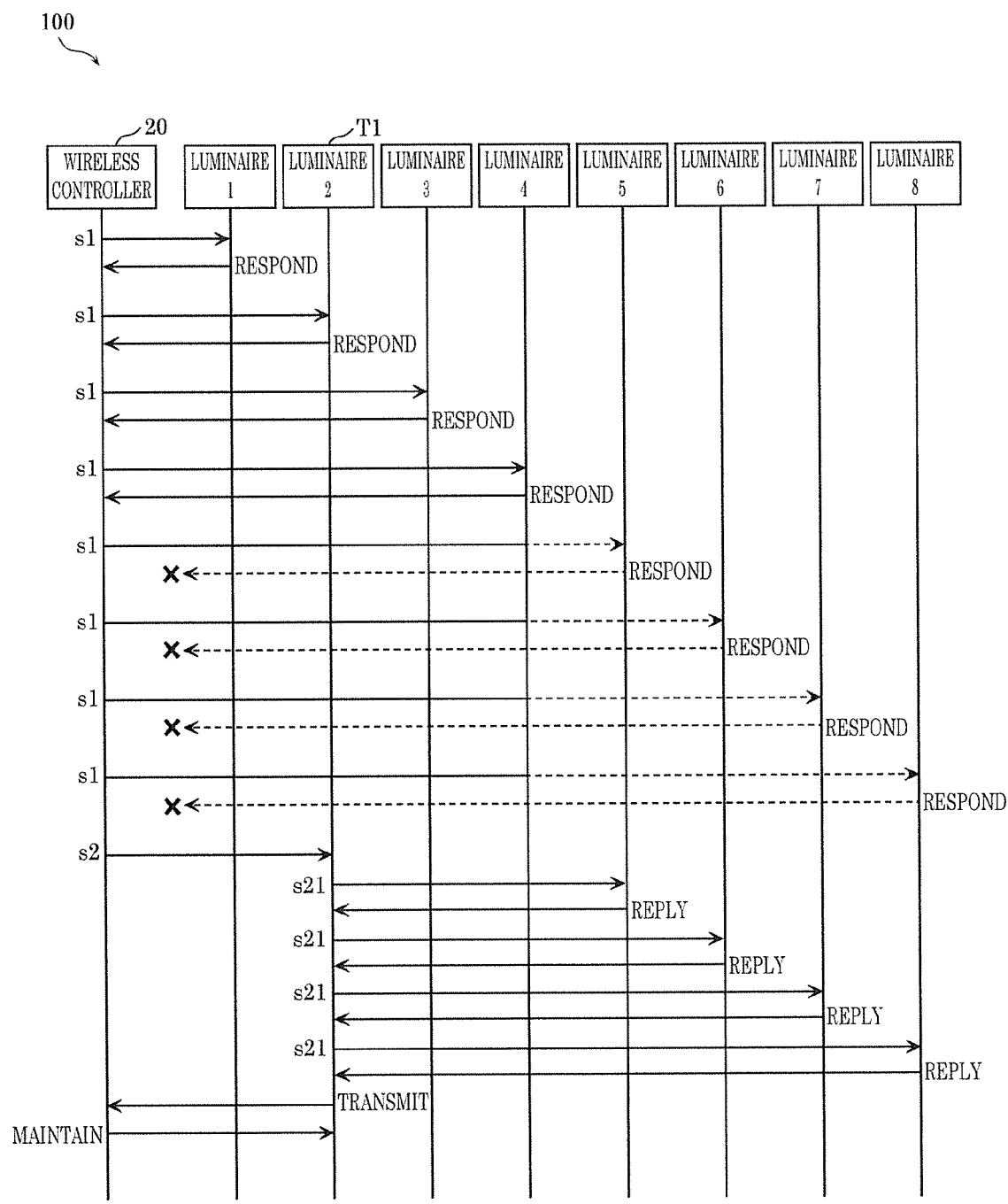
FIG. 6 is a sequence diagram of the wireless relay method of the lighting system according to Embodiment 1.

FIG. 5 is a flowchart of the wireless relay method of lighting system 100. FIG. 6 is a sequence diagram of the wireless relay method of lighting system 100. FIGS. 7A, 7B, and 7C are diagrams showing examples of a storage table stored in wireless controller 20.

A situation will be described next in which a connection state of the wireless communication is monitored after a predetermined amount of time has passed since the connection state of the wireless communication shown in FIG. 1, and the relay luminaire is reassigned when necessary.

FIG. 7A is the storage table in its initial state. The storage table in FIG. 7A contains identification information and layout information, but not yet information relating to the relayable luminaire and the communication states of wireless communications r1 and r2.

As illustrated in FIGS. 5 and 6, control unit 20c of wireless controller 20 first transmits first signal s1 to luminaires 1-8, first signal s1 instructing luminaires 1-8 to respond to a request from wireless controller 20 (S101). First signal s1 is, for example, regularly transmitted in chunks of one minute intervals. Note that first signal s1 may also be transmitted individually to luminaires 1-8.

When first signal s1 is transmitted, luminaires 1-4 disposed proximate to wireless controller 20 receive this first signal s1. Control unit 10c of each of luminaires 1-4 determines the communication quality of wireless controller 20 and measures the signal strength of first signal s1 that each control unit 10c has received. Luminaires 1-4 next send to wireless controller 20 (i) the information relating to the communication states including the communication quality and the signal strength, and (ii) the identification information about luminaires 1-4. With this, information relating to whether there has been a response from luminaires 1-4 and the communication states are stored in storage unit 20e of wireless controller 20 (see FIG. 7B).

However, luminaires 5-8 disposed far away from wireless controller 20 cannot receive first signal s1, and are in a state in which a response from luminaires 5-8 to wireless controller 20 does not arrive even when wireless controller 20 can receive first signal s1. For example, when there is no response from the luminaires after first signal s1 has been transmitted within the predetermined amount of time, a timeout occurs and information stating that there has been no response is stored in storage unit 20e of wireless controller 20 (see FIG. 7B).

Control unit 20c determines whether wireless controller 20 and luminaires 1-8 can wirelessly communicate according to the information relating to whether there has been a response from luminaires 1-8 to first signal s1.

To be specific, control unit 20c determines, out of luminaires 1-8, the presence of first group G1 including the luminaires that have responded to first signal s1 and of second group G2 including luminaires that have not responded to first signal s1 (S102).

For example, when there are no luminaires in second group G2 that have not responded to first signal s1 (N in S102), the sequence returns to step S101 since wireless controller 20 and luminaires 1-8 are able to communicate with each other without problem, and the luminaires are put on standby until a next first signal s1 is transmitted. In the present embodiment, since luminaires 1-4 in first group G1 and luminaires 5-8 in second group G2 are both present, the sequence continues to Y in step S102 as follows.

Control unit 20c (i) assigns at least one luminaire in first group G1 (e.g. luminaire 2) as relay luminaire T1 when there are luminaires in second group G2 (e.g. luminaires 5-8) (Y in S102), and (ii) transmits second signal s2 to relay luminaire T1 via second communication unit 20a (S103). Note that second signal s2 instructs relay luminaire T1 to wirelessly communicate with luminaires 5-8 in second group G2.

Control unit 20c assigns the at least one luminaire in first group G1 as relay luminaire T1 based on the intramural information stored in storage unit 20e. For example, FIG. 7B shows an example in which luminaire 2 disposed proximate to luminaires 5-8 in second group G2 is assigned as relay luminaire T1, and luminaires 5-8 are assigned as relay-destination luminaires.

FIG. 7B shows that the current number of relay luminaires T1 is 4. Luminaires 5-8 are assigned as relay-destination luminaires without problem when the number of relayable luminaires is, for example, 8. For example, when the number of relay luminaires T1 is at a maximum and the remaining number of relayable luminaires is 0, a luminaire other than luminaire 2, e.g. luminaire 3 is assigned as relay luminaire T1.

Note that an example is described above in which control unit 20c assigns the at least one luminaire in first group G1 as the relay luminaire based on the layout information stored in storage unit 20e, but this is not limited thereto. For example, control unit 20c may also assign another luminaire as the above relay luminaire based on the communication states of wireless communication r1 stored in storage unit 20e.

For example, control unit 20c may assign luminaire 2 in first group G1 shown in FIG. 7B, whose communication quality with wireless controller 20 is "good" and signal strength is "5," as relay luminaire T1. Control unit 20c may also assign luminaire 2 as relay luminaire T1 using the information about the layout information and the communication states.

Relay luminaire T1 that has received second signal s2 wirelessly communicates with luminaires 5-8 in second group G2 via first communication unit 10a. At this time, control unit 20c confirms whether the communication states between relay luminaire T1 and luminaires 5-8 in second group G2 are favorable (S104).

As illustrated in FIG. 6, for example, relay luminaire T1 transmits signal s21 for confirming the communication states of luminaires 5-8. Each control unit 10c of luminaires 5-8, which has received signal s21, determines the communication quality between each control unit 10c and relay luminaire T1, and measures the signal strength of signal s21 received by each control unit 10c. Luminaires 5-8 next send to relay luminaire T1 (i) the information relating to the communication states including the above communication quality and the signal strength, and (ii) the identification information about luminaires 5-8.

The information relating to the communication states of luminaires 5-8 is transmitted from relay luminaire T1 to wireless controller 20 and is stored in storage unit 20e (see FIG. 7C). Note that the information transmitted from relay luminaire T1 to wireless controller 20 may be transmitted as one chunk of information about luminaires 5-8 or may also be transmitted separately as information about each corresponding one of luminaires 5-8.

Control unit 20c receives information relating to the above communication states transmitted from relay luminaire T1, and, when the communication states are within the specified range (Y in S104), maintains relay luminaire T1 as such (S105). When the communication states are not within the specified range (N in S104), the sequence returns to step S103, and control unit 20c searches for another luminaire that can be assigned as relay luminaire T1. Note that the communication states being within the specified range here indicates, for example, that the signal strength scores at least 4 on the scale from 1 to 5 with 5 being the highest.

In this manner, in lighting system 100 in the present embodiment, relay luminaire T1 can be configured automatically without requiring the user to perform a special operation with regard to wireless controller 20 or luminaires 1-8 after first signal s1 has been transmitted from wireless controller 20. This makes it possible to easily assign relay luminaire T1 in lighting system 100. Note that in the present embodiment, an example has been described in which there is little change in the EME from the initial state and the relayable luminaire has not changed as a result.

1-3 Advantageous Effects, etc.

Lighting system 100 according to the present embodiment includes first luminaire 2, second luminaire 5, and wireless controller 20. First luminaire 2 and second luminaire 5 each include first communication unit 10a that communicates with wireless controller 20 and allows first luminaire 2 and second luminaire 5 to communicate with each other. Wireless controller 20 includes second communication unit 20a that communicates with first luminaire 2 and second luminaire 5, and control unit 20c that controls first luminaire 2 and second luminaire 5 via second communication unit 20a. Second communication unit 20a transmits first signal s1 to first luminaire 2 and second luminaire 5, first signal s1 instructing first luminaire 2 and second luminaire 5 to respond to a request from wireless controller 20. When first luminaire 2 responds to first signal s1 and second luminaire 5 does not respond to first signal s1, control unit 20c assigns first luminaire 2 as a relay luminaire and transmits second signal s2 to first luminaire 2 and second luminaire 5, second signal s2 instructing first luminaire 2 to wirelessly communicate with second luminaire 5 via second communication unit 20a. First luminaire 2 that has received second signal s2 wirelessly communicates with second luminaire 5 via first communication unit 10a.

This enables lighting system 100 to easily assign the relay luminaire whenever the first luminaire 2, the second luminaire 5, and wireless controller 20 wirelessly communicate. Note that in the above example, luminaire 2 out of luminaires 1-4 is given as a representative example and is also referred to as first luminaire 2. Luminaire 5 out of luminaires 5-8 is given as a representative example and is also referred to as second luminaire 5.

Lighting system 100 according to the present embodiment includes luminaires 1-8 and wireless controller 20. Luminaires 1-8 each include first communication unit 10a that communicates with wireless controller 20, and luminaires 1-8 communicate with each other via first communication unit 10a. Wireless controller 20 includes second communication unit 20a that communicates with luminaires 1-8, and control unit 20c that controls luminaires 1-8 via second communication unit 20a. Second communication unit 20a transmits first signal s1 to luminaires 1-8, first signal s1 instructing luminaires 1-8 to respond to a request from wireless controller 20. Control unit 20c (i) receives a response to first signal s1 sent from at least one luminaire of luminaires 1-8, (ii) when there is first group G1 including the at least one luminaire that has responded to first signal s1, and second group G2 including a luminaire that has not responded to first signal s1, assigns the at least one luminaire in first group G1, e.g. luminaire 2 as relay luminaire T1, and (iii) transmits second signal s2 to relay luminaire T1, second signal s2 instructing relay luminaire T1 to wireless communicate with the luminaire in second group G2, e.g. luminaires 5-8 via second communication unit 20a. Relay luminaire T1 that has received second signal s2 wirelessly communicates with the luminaire in second group G2 via first communication unit 10a.

This makes it possible to easily assign relay luminaire T1 whenever luminaires 1-8 and wireless controller 20 in lighting system 100 wirelessly communicate.

Lighting system 100 may further include storage unit 20e that stores the intramural layout information of building 101 including the placement information of wireless controller 20 and luminaires 1-8. Control unit 20c may assign the at least one luminaire in first group G1 as relay luminaire T1 based on the layout information stored in storage unit 20e.

This makes it possible to correctly assign relay luminaire T1 by assigning relay luminaire T1 based on the layout information.

Control unit 20c may assign the at least one luminaire in first group G1 as relay luminaire T1 based on the communication states between wireless controller 20 and first group G1.

This makes it possible to correctly assign relay luminaire T1 by assigning relay luminaire T1 based on the communication states between wireless controller 20 and the luminaires.

Control unit 20c may assign the at least one luminaire in first group G1 as relay luminaire T1 based on the number of relayable luminaires in first group G1.

This makes it possible to correctly assign relay luminaire T1 by assigning relay luminaire T1 based on the number of relayable luminaires.

Control unit 20c may regularly transmit first signal s1 via second communication unit 20a.

This makes it possible to assign relay luminaire T1 in accordance with the EME that changes over time and the inner layout of building 101.

Relay luminaire T1 that has wirelessly communicated with the luminaire in second group G2 may transmit the communication state between relay luminaire T1 and the luminaire in second group G2 to wireless controller 20 via first communication unit 10a. Control unit 20c receives the communication state transmitted from relay luminaire T1, and maintains relay luminaire T1 as such when the communication state is within the specified range.

This makes it possible to correctly maintain relay luminaire T1 as such by confirming the communication states between relay luminaire T1 and the luminaires in second group G2.

The wireless relay method of lighting system 100 according to the present embodiment including luminaires 1-8 and wireless controller 20 that communicates with luminaires 1-8, in which at least one luminaire is assigned from luminaires 1-8, and luminaires 1-8 and wireless controller 20 wirelessly communicate with one another, the method including the following steps 1) to 3). 1) A step for transmitting first signal s1 to luminaires 1-8, first signal s1 instructing luminaires 1-8 to respond to a request from wireless controller 20. 2) A step for (i) receiving a response to first signal s1 sent from the at least one luminaire of luminaires 1-8, (ii) when there is first group G1 including a luminaire of luminaires 1-8 that has responded to first signal s1, and second group G2 including a luminaire that has not responded to first signal s1, assigning the at least one luminaire in first group G1 as relay luminaire T1, and (iii) transmitting second signal s2 to relay luminaire T1, second signal s2 instructing relay luminaire T1 to communicate with the luminaire in second group G2. 3) A step for wireless communicating between relay luminaire T1 that has received second signal s2 and the luminaire in second group G2.

This enables the wireless relay method of the above lighting system 100 to easily assign relay luminaire T1 and to wirelessly relay.

The wireless relay method of lighting system 100 further includes the following steps. 4) A step for obtaining a communication state (i) between relay luminaire T1 that has wirelessly communicated with the luminaire in second group G2 and (ii) the luminaire in second group G2. 5) A step for maintaining relay luminaire T1 as such when the communication state obtained is within a specified range.

This makes it possible to correctly maintain relay luminaire T1 as such by obtaining the communication states between relay luminaire T1 and the luminaires in second group G2, and to wirelessly relay.

1-4 Variation

Lighting system 100A according to a variation of Embodiment 1 will be described next with reference to FIG. 8. Lighting system 100A according to the variation includes operating terminal 30 in addition to wireless controller 20 and luminaires 1-8.

Figure 8:
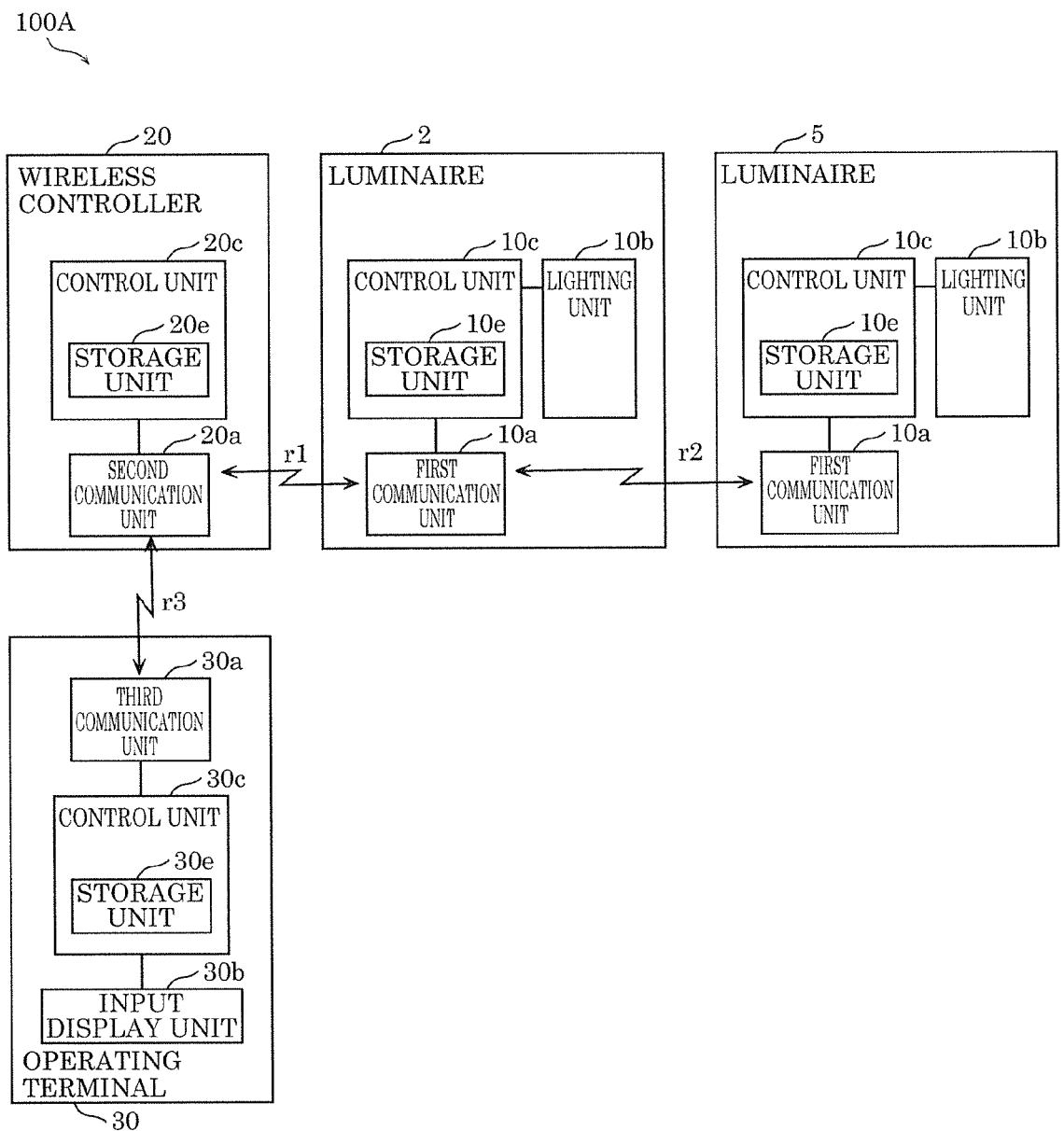
FIG. 8 is a block diagram showing a configuration of a lighting system according to a variation of Embodiment 1.

FIG. 8 is a block diagram showing a configuration of lighting system 100A according to the variation.

Operating terminal 30 includes third communication unit 30a, input display unit 30b, and control unit 30c connected to third communication unit 30a and input display unit 30b.

Third communication unit 30a communicates with wireless controller 20 via wireless communication r3. The communication method of wireless communication r3 uses, for example, Wi-Fi® or infrared communication.

Input display unit 30b is, for example, a touch panel, and displays information relating to layout information about lighting system 100A in building 101 and a connection relationship of the wireless communication, and receives an operation input of the user.

Control unit 30c includes a CPU and transmits a command received from input display unit 30b to wireless controller 20 via third communication unit 30a. Control unit 30c includes storage unit 30a having RAM, ROM, and the like. Control unit 30c, for example, causes input display unit 30b to display the information relating to the connection relationship of the wireless communication transmitted from wireless controller 20.

Operating terminal 30 receives the operation of the user in input display unit 30b, and transmits a prompt signal for causing the previously-mentioned first signal s1 to be transmitted to wireless controller 20. Control unit 20c of wireless controller 20 transmits first signal s1 to luminaires 1-8 via second communication unit 20a when control unit 20c receives a prompt signal from operating terminal 30 instructing transmission of first signal s1.

Lighting system 100A in such a variation further includes operating terminal 30 that communicates with wireless controller 20. Control unit 20c transmits first signal s1 via second communication unit 20a when control unit 20c receives a the prompt signal from operating terminal 30 instruction transmission of first signal s1.

This variation makes it possible to assign relay luminaire T1 using operating terminal 30 when the user wants to rectify the connection state of the wireless communication. This makes it possible to easily configure relay luminaire T1 in lighting system 100A.

Embodiment 2

Lighting system 100 according to Embodiment 2 will be described next with reference to FIGS. 9 to 11B. In lighting system 100B according to Embodiment 2, obstruction 102 is disposed inside building 101 and the EME is changed. An example in which the configuration of the relay luminaire is adjusted and another luminaire is assigned as the relay luminaire is described.

Figure 9:
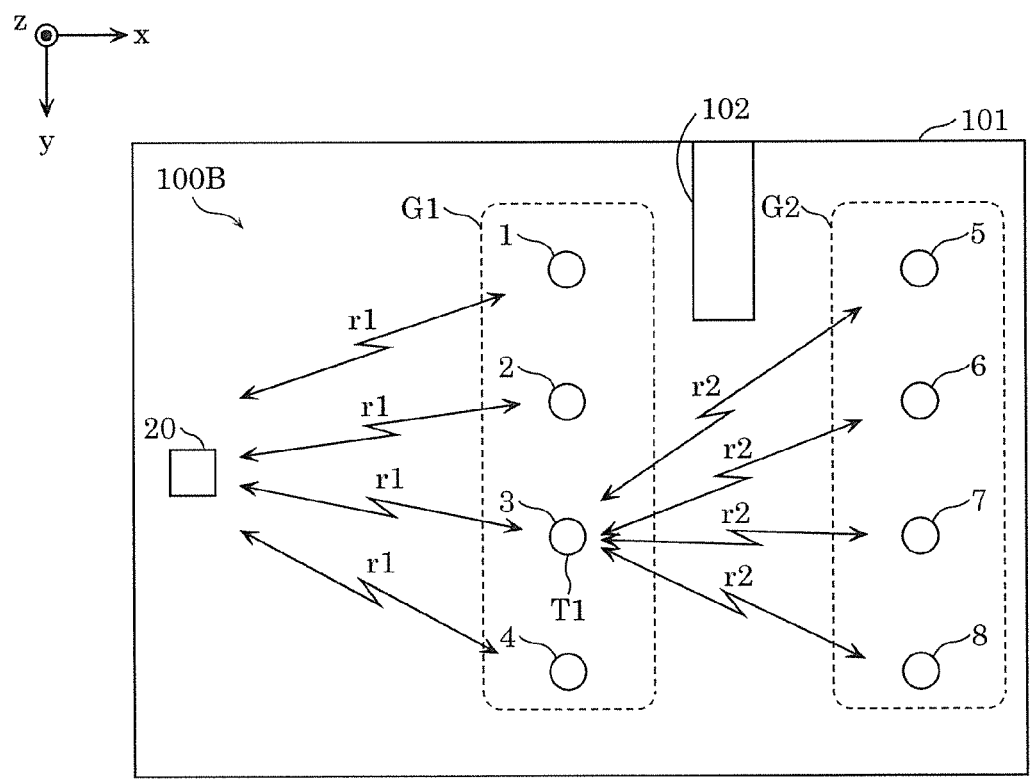
FIG. 9 is a schematic view of the luminaires included in a lighting system and the wireless controller according to Embodiment 2 viewed from the ceiling of the building.
Figure 10:
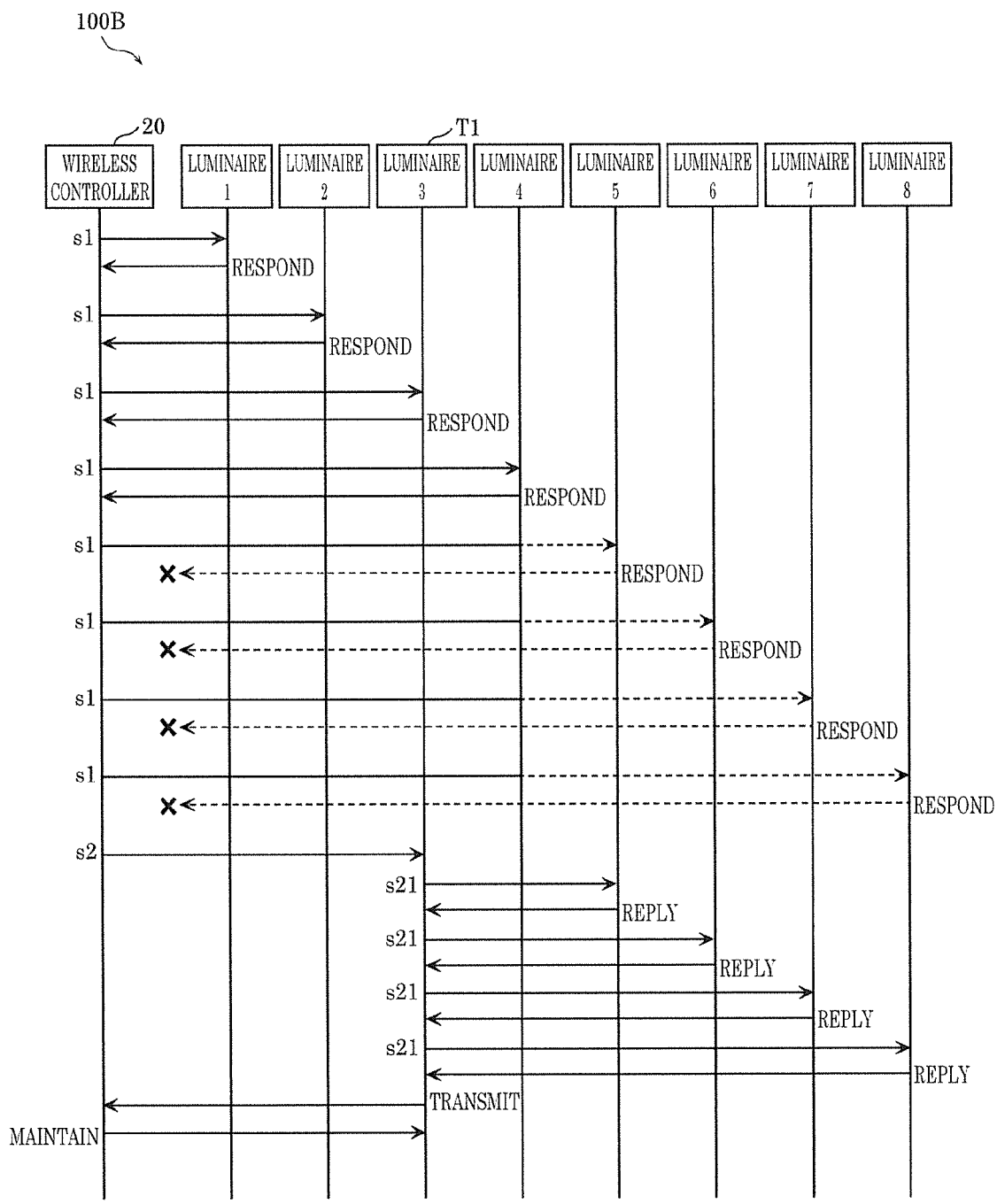
FIG. 10 is a sequence diagram of a wireless relay method of the lighting system according to Embodiment 2.

FIG. 9 is a schematic view of luminaires 1-8 included in lighting system 100B and wireless controller 20 in Embodiment 2 viewed from the ceiling of building 101. FIG. 10 is a sequence diagram of a wireless relay method of lighting system 100B. FIGS. 11A and 11B are diagrams showing examples of a storage table stored in storage unit 20e of wireless controller 20.

Lighting system 100B includes luminaires 1-8 and wireless controller 20 that wirelessly communicates with at least one of luminaires 1-8.

As illustrated in FIG. 9, for lighting system 100B, obstruction 102, e.g. a partition, is disposed inside building 101. It is, therefore, difficult for luminaire 2 and luminaire 5 to communicate through wireless communication r2.

FIG. 11A is the storage table in its initial state. The storage table in FIG. 11A contains layout information including placement information about obstruction 102 in addition to placement information about wireless controller 20 and luminaires 1-8.

As illustrated in FIG. 10, control unit 20c of wireless controller 20 first transmits first signal s1 to luminaires 1-8, first signal s1 instructing luminaires 1-8 to respond to a request from wireless controller 20 (see S101 in FIG. 5).

Control unit 20c determines whether wireless controller 20 and luminaires 1-8 can wirelessly communicate according to the information relating to whether there has been a response from luminaires 1-8 to first signal s1.

To be specific, control unit 20c determines, out of luminaires 1-8, the presence of first group G1 including the luminaires that have responded to first signal s1 and of second group G2 including luminaires that have not responded to first signal s1 (see S102 in FIG. 5).

Control unit 20c (i) assigns at least one luminaire in first group G1, e.g. luminaire 3, as relay luminaire T1 when there are luminaires in second group G2, e.g. luminaires 5-8 (Y in S102), and (ii) transmits second signal s2 to relay luminaire T1 via second communication unit 20a (see S103 in FIG. 5).

Control unit 20c assigns the at least one luminaire in first group G1 as relay luminaire T1 based on the intramural information stored in memory unit 20e. FIG. 11B, for example, shows an example in which luminaire 2 cannot be configured as the relay luminaire since there is obstruction 102 between luminaire 2 and luminaire 5, and luminaire 3 is configured as relay luminaire T1.

Note that an example is described above in which control unit 20c assigns the at least one luminaire in first group G1 as the relay luminaire based on the layout information stored in storage unit 20e, but this is not limited thereto. For example, control unit 20c may also assign another luminaire as the above relay luminaire based on the communication states of wireless communication r1 stored in storage unit 20e.

Relay luminaire T1 that has received second signal s2 wirelessly communicates with luminaires 5-8 in second group G2 via first communication unit 10a. At this time, control unit 20c confirms whether the communication states between relay luminaire T1 and luminaires 5-8 in second group G2 are favorable (see S104 in FIG. 5).

Luminaires 5-8 transmit to relay luminaire T1 (i) the information relating to the communication states including the communication quality and the signal strength, and (ii) the identification information about luminaires 5-8.

The information relating to the communication states of luminaires 5-8 is transmitted from relay luminaire T1 to wireless controller 20 and is stored in storage unit 20e (see FIG. 11B).

Control unit 20c receives information relating to the above communication states transmitted from relay luminaire T1, and, when the communication states are within the specified range (Y in S104), maintains relay luminaire T1 as such (see S105 in FIG. 5). When the above communication states are not within the specified range (N in S104), the sequence returns to step S103, and control unit 20c searches for another luminaire that can be assigned as relay luminaire T1.

In Embodiment 2, relay luminaire T1 can be easily assigned whenever luminaires 1-8 and wireless controller 20 wirelessly communicate similar to Embodiment 1.

Embodiment 3

Lighting system 100C according to Embodiment 3 will be described next with reference to FIGS. 12 to 15B. In lighting system 100C according to Embodiment 3, an example is described in which the relay luminaire is assigned while power supply line 46, out of power supply lines 46 and 47 of luminaires 1-8, is turned off.

Figure 12:
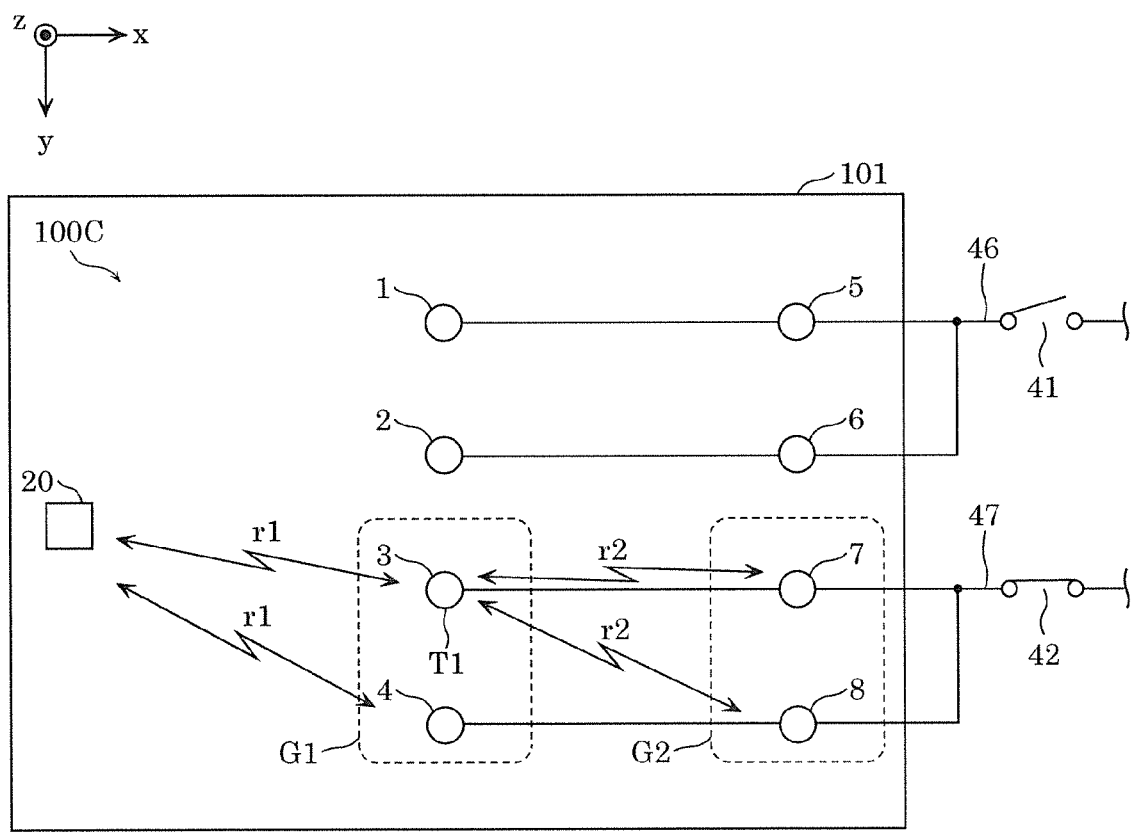
FIG. 12 is a schematic view of the luminaires included in a lighting system and the wireless controller according to Embodiment 3 viewed from the ceiling of the building.
Figure 13:
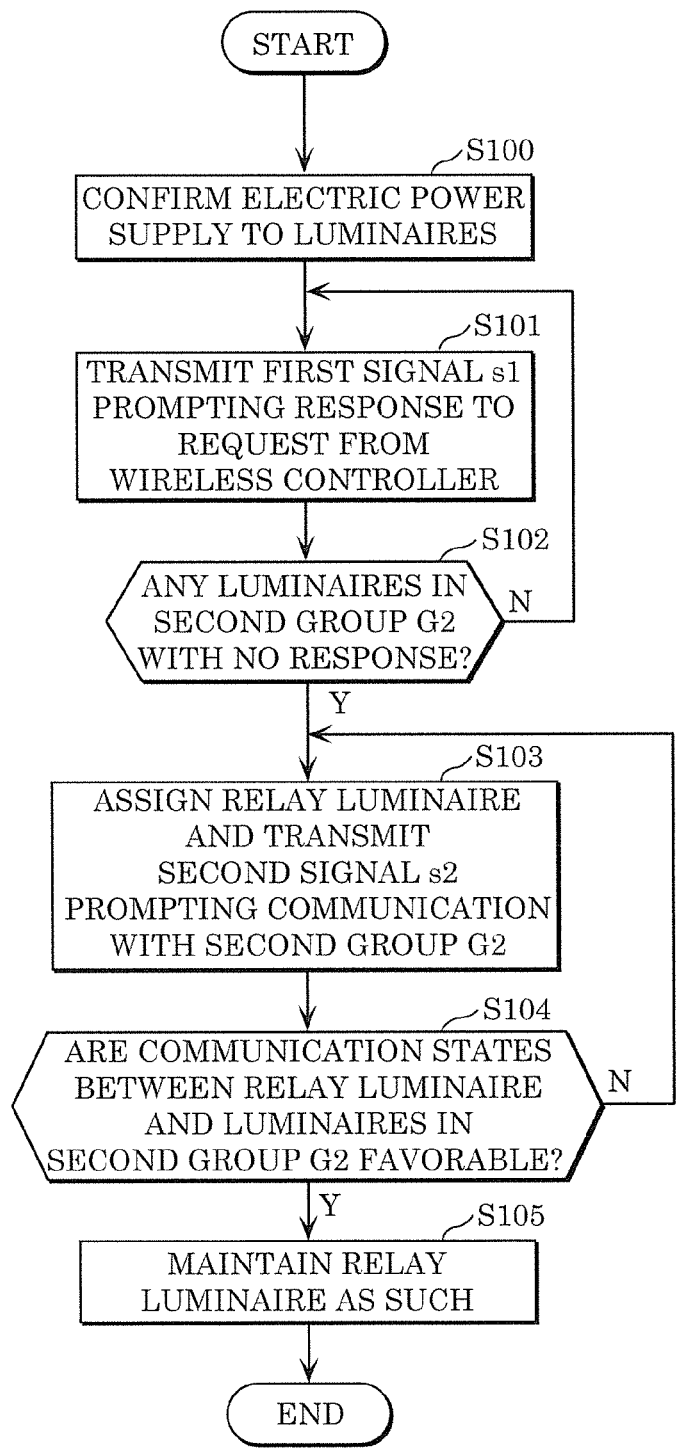
FIG. 13 is a flowchart of a wireless relay method of the lighting system according to Embodiment 3.
Figure 14:
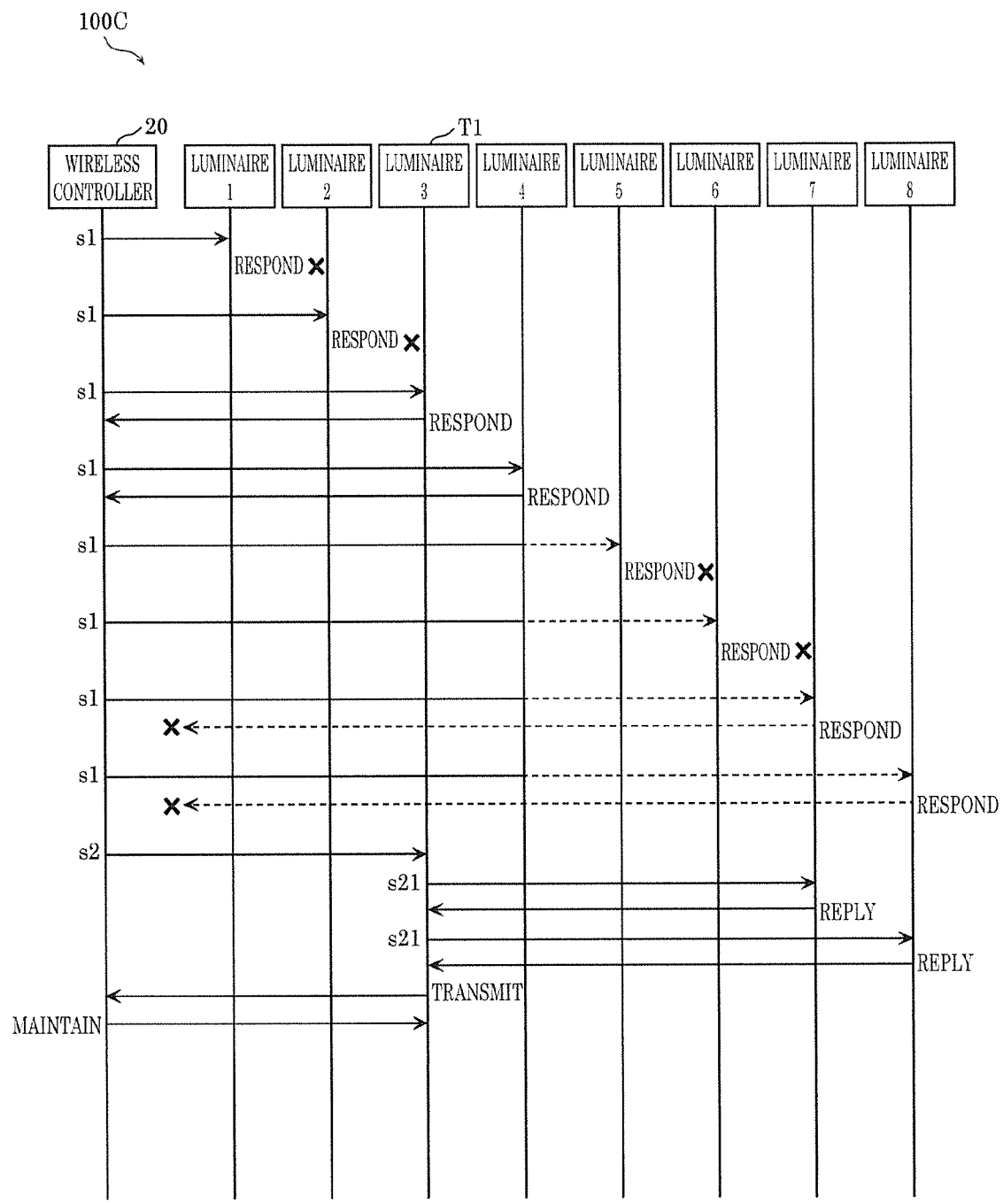
FIG. 14 is a sequence diagram of the wireless relay method of the lighting system according to Embodiment 3.

FIG. 12 is a schematic view of luminaires 1-8 included in lighting system 100C and wireless controller 20 in Embodiment 3 viewed from the ceiling of building 101. FIG. 13 is a flowchart of a wireless relay method of lighting system 100C. FIG. 14 is a sequence diagram of the wireless relay method of lighting system 100C. FIGS. 15A and 15B are diagrams showing examples of a storage table stored in storage unit 20e of wireless controller 20.

Lighting system 100C includes luminaires 1-8 and wireless controller 20 that wirelessly communicates with at least one of luminaires 1-8. Lighting system 100C further includes power switch 41 connected to luminaires 1, 2, 5, and 6 via power supply line 46, and power switch 42 connected to luminaires 3, 4, 7, and 8 via power supply line 47.

In lighting system 100C, control unit 20c first confirms whether electric power is supplied to luminaires 1-8. In lighting system 100C in present embodiment, power switch 42 is turned on, but power switch 41 is turned off. Luminaires 1, 2, 5, and 6, therefore, cannot communicate with wireless controller 20.

FIG. 15A is the storage table in its initial state. The storage table in FIG. 15A contains information relating to on and off states of power switches 41 and 42 in addition to placement information about wireless controller 20 and luminaires 1-8.

Control unit 20c of wireless controller 20 next transmits first signal s1 to luminaires 1-8, first signal s1 instructing luminaires 1-8 to respond to a request from wireless controller 20 (S101). First signal s1 is transmitted simultaneously in a direction of where luminaires 1-8 are disposed, but since power switch 41 is turned off, luminaires 1, 2, 5, and 6 are inevitably excluded from being configured as the relay luminaire and relay-destination luminaire.

Control unit 20c determines whether wireless controller 20 and luminaires 3, 4, 7, and 8 can wirelessly communicate according to the information relating to whether there has been a response from luminaires 3, 4, 7, and 8 to first signal s1.

To be specific, control unit 20c determines, out of luminaires 3, 4, 7, and 8 with power switch 42 turned on, the presence of first group G1 including the luminaires that have responded to first signal s1 and of second group G2 including luminaires that have not responded to first signal s1 (S102).

Control unit 20c (i) assigns at least one luminaire of first group G1, e.g. luminaire 3 as relay luminaire T1 when there are luminaires in second group G2, e.g. luminaires 7 and 8 (Y in S102), and (ii) transmits second signal s2 to relay luminaire T1 via second communication unit 20a (see S103).

Control unit 20c assigns the at least one luminaire in first group G1 as relay luminaire T1 based on the intramural information stored in memory unit 20e. For example, FIG. 15B shows an example of luminaire 3 disposed proximate to luminaires 7 and 8 in second group G2 assigned as relay luminaire T1, and luminaires 7 and 8 assigned as relay-destination luminaires.

Note that an example is described above in which control unit 20c assigns the at least one luminaire in first group G1 as relay luminaire T1 based on the layout information stored in storage unit 20e, but this is not limited thereto. For example, control unit 20c may also assign another luminaire as the above relay luminaire based on the communication states of wireless communication r1 stored in storage unit 20e.

Relay luminaire T1 that has received second signal s2 wirelessly communicates with luminaires 7 and 8 in second group G2 via first communication unit 10a. At this time, control unit 20c confirms whether the communication states between relay luminaire T1 and luminaires 7 and 8 in second group G2 are favorable (S104).

Luminaires 7 and 8 transmit to relay luminaire T1 (i) the information relating to the communication states including the communication quality and the signal strength, and (ii) the identification information about luminaires 7 and 8.

The information relating to the communication states of luminaires 7 and 8 is transmitted from relay luminaire T1 to wireless controller 20 and is stored in storage unit 20e (see FIG. 15B).

Control unit 20c receives information relating to the above communication states transmitted from relay luminaire T1, and, when the communication states are within the specified range (Y in S104), maintains relay luminaire T1 as such (S105). When the above communication states are not within the specified range (N in S104), the sequence returns to step S103, and control unit 20c searches for another luminaire that can be assigned as relay luminaire T1.

In this manner, lighting system 100C in Embodiment 3 further includes power switches 41 and 42 for switching on and off a supply of electric power to luminaires 1-8. Control unit 20c may assign the at least one luminaire in first group G1 as relay luminaire T1 from the luminaires in first group G1 to which the electric power is supplied.

This makes it possible to assign relay luminaire T1 depending on the on and off states of power switches 41 and 42.

Embodiment 4

Lighting system 100D according to Embodiment 4 will be described next with reference to FIGS. 16 to 18. In lighting system 100D according to Embodiment 4, an example is described in which a communication anomaly has occurred in the relay luminaire and a different luminaire is configured as the relay luminaire.

Figure 16:
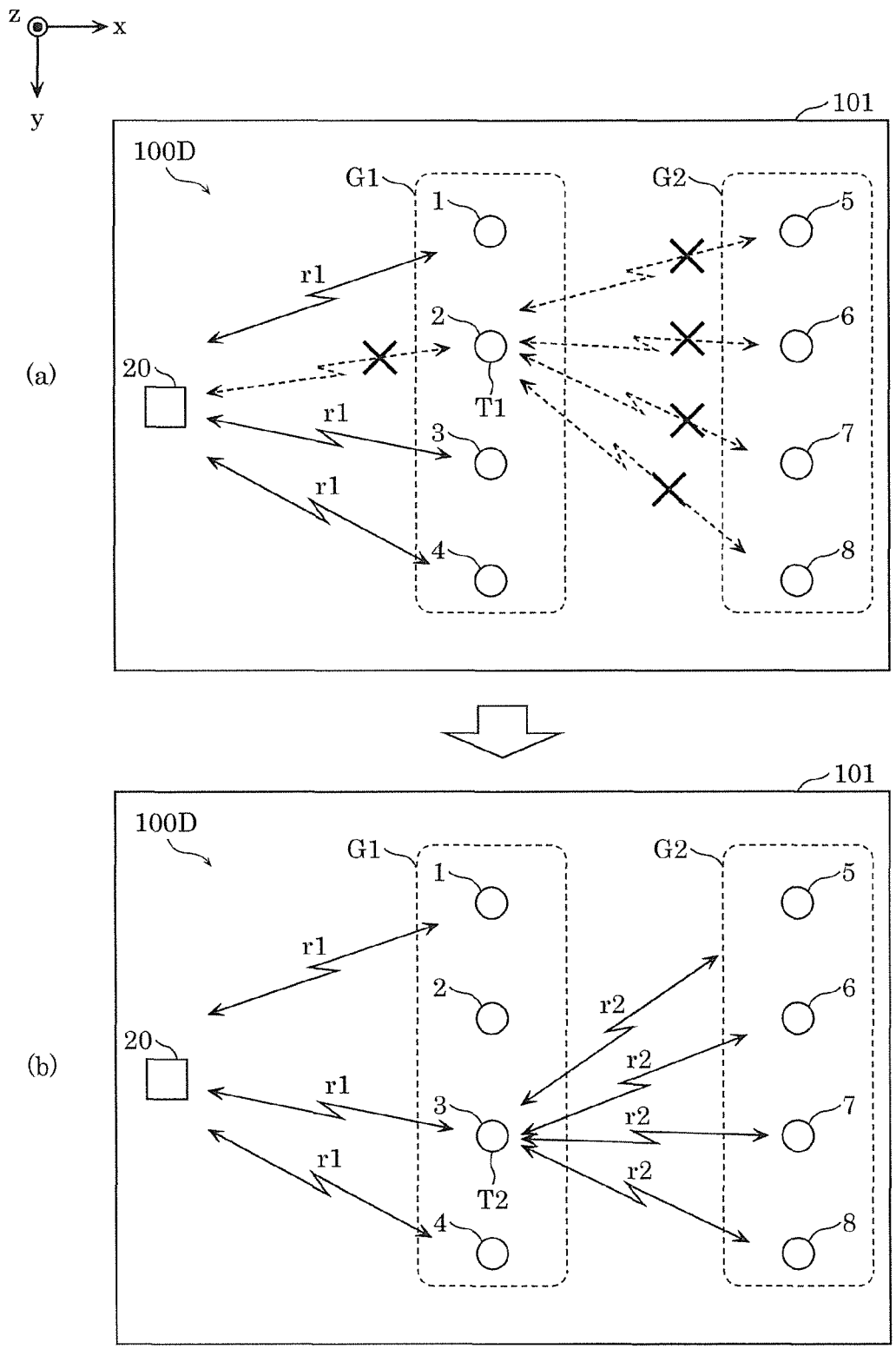
FIG. 16 is a schematic view of the luminaires included in a lighting system and the wireless controller according to Embodiment 4 viewed from the ceiling of the building.
Figure 17:
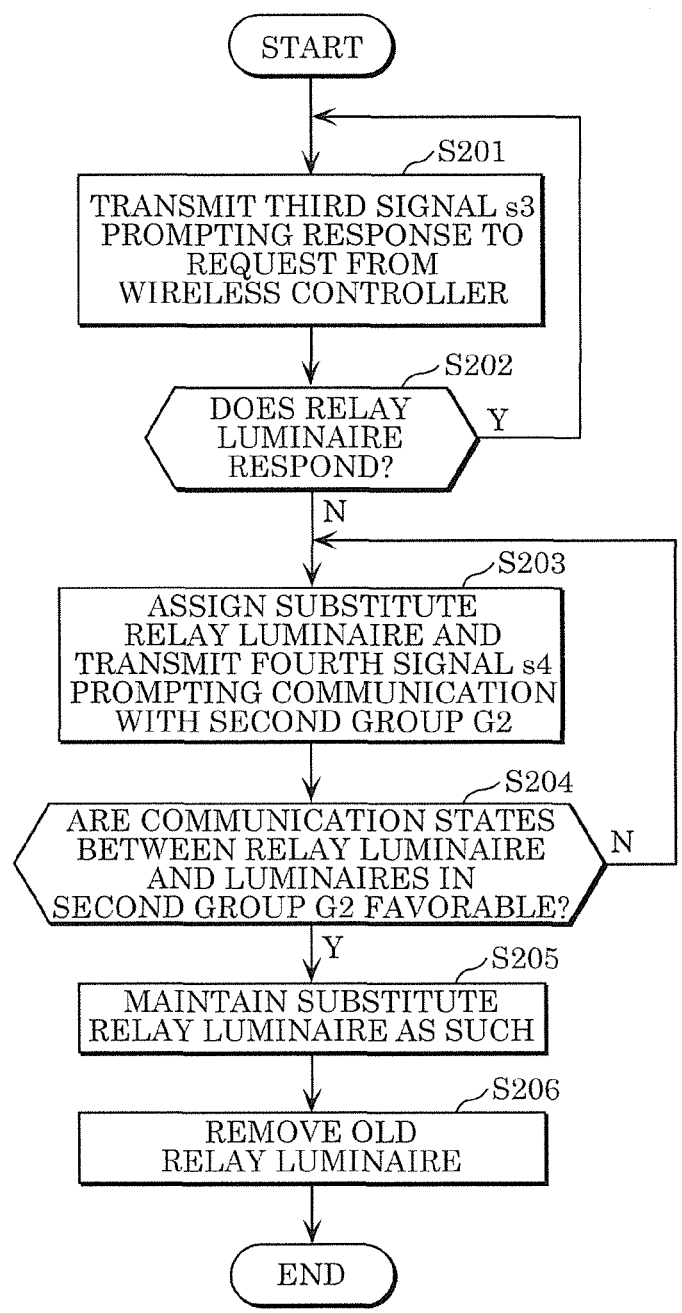
FIG. 17 is a flowchart of a wireless relay method of the lighting system according to Embodiment 4.

FIG. 16 is a schematic view of luminaires 1-8 included in lighting system 100D and wireless controller 20 viewed from the ceiling of building 101. FIG. 17 is a flowchart of a wireless relay method of lighting system 100D. FIG. 18 is a sequence diagram of the wireless relay method of lighting system 100D.

Lighting system 100D includes luminaires 1-8 and wireless controller 20 that wirelessly communicates with at least one of luminaires 1-8.

Image (a) of FIG. 16 shows a state in which luminaire 2 can no longer communicate with wireless controller 20 for a certain reason, and luminaires 5-8, which had luminaire 2 as relay luminaire T1 up until now, can also no longer communicate with wireless controller 20. In the present embodiment, as illustrated in image (b) of FIG. 16, a situation is described in which wireless communication is restored by assigning a different relay luminaire T2 instead of relay luminaire T1.

Control unit 20c of wireless controller 20 first transmits third signal s3 to relay luminaire T1 (S201). Note that third signal s3 instructs relay luminaire T1 to respond to a request from wireless controller 20. Third signal s3 is, for example, regularly transmitted in chunks of one minute intervals.

Control unit 20c next determines whether relay luminaire T1 has responded to third signal s3 (S202). When relay luminaire T1 has responded to third signal s3 (Y in S202), the sequence returns to step S201 since relay luminaire T1 is able to communicate without problem, and relay luminaire T1 is put on standby until a next third signal s3 is transmitted. Note that in the present embodiment, since relay luminaire T1 cannot communicate any longer, the sequence continues to N in step S202 as follows.

Control unit 20c (i) assigns at least one luminaire in first group G1, e.g. luminaire 3, as substitute relay luminaire T2, and (ii) transmits fourth signal s4 to substitute relay luminaire T2 via second communication unit 20a (S203).

Note that second signal s4 prompts substitute relay luminaire T2 to wirelessly communicate with luminaires 5-8 in second group G2.

Relay luminaire T2 that has received second signal s4 wirelessly communicates with luminaires 5-8 in second group G2 via first communication unit 10a. At this time, control unit 20c confirms whether the communication states between relay luminaire T2 and luminaires 5-8 in second group G2 are favorable (S204).

Figure 18:
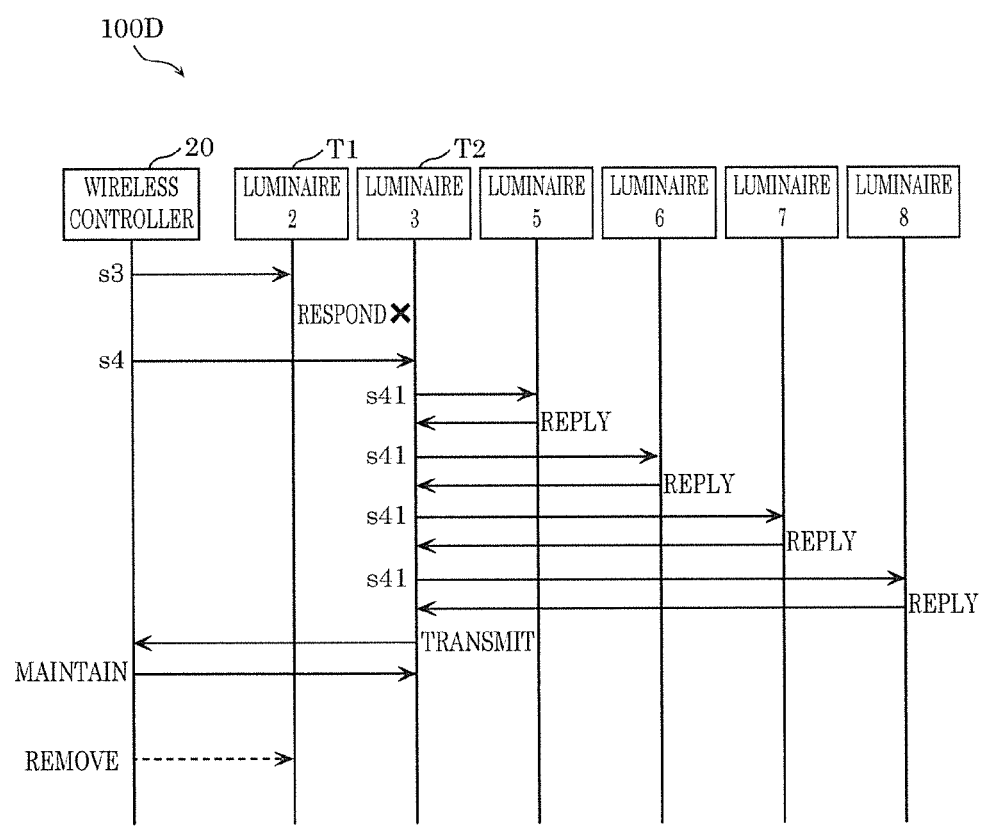
FIG. 18 is a sequence diagram of the wireless relay method of the lighting system according to Embodiment 4.

As illustrated in FIG. 18, for example, relay luminaire T2 transmits signal s41 for confirming the communication states of luminaires 5-8. Each control unit 10c of luminaires 5-8, which has received signal s41, determines the communication quality between each control unit 10c and relay luminaire T2, and measures the signal strength of signal s41 received by each control unit 10c. Luminaires 5-8 next transmit to relay luminaire T2 (i) the information relating to the communication states including the above communication quality and the signal strength, and (ii) the identification information about luminaires 5-8.

The information relating to the communication states of luminaires 5-8 and relay luminaire T2 is transmitted from relay luminaire T2 to wireless controller 20 and is stored in storage unit 20e. Note that the information relating to the communication state between wireless controller 20 and relay luminaire T2, the number of relayable luminaires T2, and the on and off state of relay luminaire T2 may also be transmitted at this time.

Control unit 20c receives information relating to the above communication states transmitted from relay luminaire T2, and, when the communication states are within the specified range (Y in S204), maintains relay luminaire T2 as such (S205). When the above communication states are not within the specified range (N in S204), the sequence returns to step S203, and control unit 20c searches for another luminaire that can be assigned as relay luminaire T2.

Control unit 20c then removes the old relay luminaire T1 as possible relay luminaire to avoid overlapping when luminaire 3 has been assigned as relay luminaire T2 (S206).

In lighting system 100D in Embodiment 4, control unit 20c transmits third signal s3 to relay luminaire T1, third signal s3 instructing relay luminaire T1 to respond to a request from wireless controller 20 via second communication unit 20a. When relay luminaire T1 does not respond to third signal s3, control unit 20c (i) assigns at least one luminaire in first group G1 as substitute relay luminaire T2 of relay luminaire T1, and (ii) transmits fourth signal s4 to substitute relay luminaire T2, fourth signal s4 instructing substitute relay luminaire T2 wireless communicate with the luminaire in second group G2 via second communication unit 20a. Substitute relay luminaire T2 that has received fourth signal s4 wirelessly communicates with the luminaire in second group G2 via first communication unit 10a.

This makes it possible to easily assign substitute relay luminaire T2 when relay luminaire T1 can no longer communicate in lighting system 100D.

Lighting system 100D may include storage unit 20e that stores intramural layout information of building 101 including placement information about substitute relay luminaire T2 and the luminaire in second group G2. Control unit 20c may assign the at least one luminaire as substitute relay luminaire T2 of relay luminaire T1 based on the intramural layout information stored in storage unit 20e.

This makes it possible to correctly assign relay luminaire T2 by assigning substitute relay luminaire T2 based on the layout information.

Control unit 20c may assign the at least one luminaire as substitute relay luminaire T2 of relay luminaire T1 based on a communication state between wireless controller 20 and each luminaire in first group G1.

This makes it possible to correctly assign relay luminaire T2 by assigning substitute relay luminaire T2 based on the communication state between wireless controller 20 and substitute relay luminaire T2.

Control unit 20c may assign the at least one luminaire as substitute relay luminaire T2 of relay luminaire T1 based on the number of relayable luminaires in first group G1.

This makes it possible to correctly assign relay luminaire T2 by assigning substitute relay luminaire T2 based on the number of relayable luminaires.

Lighting system 100D may include power switches 41 and 42 for switching on and off a supply of electric power to the relay luminaire. Control unit 20c may assign the at least one luminaire in first group G1 as substitute relay luminaire T2 of relay luminaire T1 to which the electric power is supplied.

This makes it possible to assign substitute relay luminaire T2 according to the on and off states of power switches 41 and 42.

Control unit 20c may regularly transmit first signal s3 via second communication unit 20a.

This makes it possible to assign substitute relay luminaire T2 according to the EME that changes over time and the inner layout of building 101.

Substitute relay luminaire T2 that has wirelessly communicated with the luminaire in second group G2 may transmit the communication state between substitute relay luminaire T2 and the luminaire in second group G2 to wireless controller 20 via first communication unit 10a. Control unit 20c may receive the communication state transmitted from substitute relay luminaire T2, and maintain substitute relay luminaire T2 as such when the communication state is within the specified range.

This makes it possible to correctly maintain relay luminaire T2 as such by confirming the communication states between substitute relay luminaire T2 and the luminaires in second group G2.

Lighting system 100D in Embodiment 4 includes luminaires 1-8 and wireless controller 20. Luminaires 1-8 each include first communication unit 10a that communicates with wireless controller 20, and luminaires 1-8 communicate with each other via first communication unit 10a. Wireless controller 20 includes second communication unit 20a that communicates with luminaires 1-8, and control unit 20c that controls luminaires 1-8 via second communication unit 20a. Luminaires 1-8 include relay luminaire T1 that relays wireless communication of wireless controller 20, and a relay-destination luminaire that wirelessly communicates with the wireless controller via relay luminaire T1. Control unit 20c transmits third signal s3 to relay luminaire T1, third signal s3 instructing relay luminaire T1 to respond to a request from wireless controller 20 via second communication unit 20a. When relay luminaire T1 does not respond to third signal s3, control unit 20c (i) assigns at least one luminaire as substitute relay luminaire T2 of relay luminaire T1, and (ii) transmits fourth signal s4 to substitute relay luminaire T2 via second communication unit 20a, fourth signal s4 instructing substitute relay luminaire T2 to wirelessly communicate with the relay-destination luminaire, e.g. luminaires 5-8. Substitute relay luminaire T2 that has received fourth signal s4 wirelessly communicates with the relay-destination luminaires 5-8 via first communication unit 10a.

This makes it possible to easily assign substitute relay luminaire T2 when relay luminaire T1 can no longer communicate in lighting system 100D.

OTHER EMBODIMENTS

Lighting system 100 and the like have been described above based on the embodiment, but the present disclosure is not limited to the foregoing. Forms obtained by various modifications to the embodiments that can be conceived by a person skilled in the art as well as forms realized by optionally combining components and functions in the embodiments which are within the scope of the essence of the present disclosure are included in the present disclosure.

For example, wireless controller 20 shown in each of the embodiments is disposed on the ceiling of building 101, but is not limited thereto. Wireless controller 20 may be, for example, a desktop computer terminal and may also be a portable computer terminal. Wireless controller 20 in the lighting system is not limited to one controller and may also be a plurality of controllers. The lighting system may further include a host controller that supervises the plurality of controllers. The storage table may also be contained in a storage unit of the host controller.

For example, in each of the embodiments, the number of luminaires to be assigned as relay luminaire is not limited to 1 when at least one luminaire in first group G1 is assigned as relay luminaire T1, and a plurality of luminaires may also be assigned as the relay luminaire.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting system comprising a first luminaire, a second luminaire, and a wireless controller, wherein:
   the first luminaire and the second luminaire each include a first communication unit configured to communicate with the wireless controller, and the first luminaire and the second luminaire communicate with each other via the first communication units each being the first communication unit,
   the wireless controller includes a second communication unit configured to communicate with the first luminaire and the second luminaire, and a control unit configured to control the first luminaire and the second luminaire via the second communication unit,
   the second communication unit is configured to transmit a first signal to the first luminaire and the second luminaire, the first signal instructing the first luminaire and the second luminaire to respond to a request from the wireless controller,
   the control unit is configured to, when the first luminaire responds to the first signal and the second luminaire does not respond to the first signal, assign the first luminaire as a relay luminaire and transmit a second signal to the first luminaire, the second signal instructing the first luminaire to wirelessly communicate with the second luminaire via the second communication unit, and
   the first luminaire that has received the second signal wirelessly communicates with the second luminaire via the first communication unit.

2. A lighting system comprising a plurality of luminaires and a wireless controller, wherein:
   the plurality of luminaires each include a first communication unit configured to communicate with the wireless controller, and the plurality of luminaires communicate with each other via the first communication units each being the first communication unit,
   the wireless controller includes a second communication unit configured to communicate with the plurality of luminaires, and a control unit configured to control the plurality of luminaires via the second communication unit,
   the second communication unit is configured to transmit a first signal to the plurality of luminaires, the first signal instructing the plurality of luminaires to respond to a request from the wireless controller,
   the control unit is configured to (i) receive a response to the first signal sent from at least one luminaire of the plurality of luminaires, (ii) when there is a first group including the at least one luminaire that has responded to the first signal, and a second group including a luminaire that has not responded to the first signal, assign the at least one luminaire in the first group as a relay luminaire, and (iii) transmit a second signal to the relay luminaire, the second signal instructing the relay luminaire to wirelessly communicate with at least one luminaire in the second group via the second communication unit, and
   the relay luminaire that has received the second signal wirelessly communicates with the at least one luminaire in the second group via the first communication unit.

3. The lighting system according to claim 2, further comprising:
   a storage unit configured to store intramural layout information including placement information about the wireless controller and the plurality of luminaires, wherein
   the control unit is configured to assign the at least one luminaire in the first group as the relay luminaire based on the intramural layout information stored in the storage unit.

4. The lighting system according to claim 2, wherein
   the control unit is configured to assign the at least one luminaire in the first group as the relay luminaire based on a communication state between the wireless controller and the first group.

5. The lighting system according to claim 2, wherein
   the control unit is configured to assign the at least one luminaire in the first group as the relay luminaire based on a number of relayable luminaires in the first group.

6. The lighting system according to claim 2, further comprising:
   a power switch for switching on and off a supply of electric power to the plurality of luminaires, wherein
   the control unit is configured to assign the at least one luminaire in the first group as the relay luminaire from one or more luminaires in the first group to which the electric power is supplied.

7. The lighting system according to claim 2, wherein
   the control unit is configured to regularly transmit the first signal to the plurality of luminaires via the second communication unit.

8. The lighting system according to claim 2, further comprising:
   an operating terminal that communicates with the wireless controller, wherein
   the control unit is configured to transmit the first signal to the plurality of luminaires via the second communication unit when the control unit receives a prompt signal from the operating terminal instructing transmission of the first signal.

9. The lighting system according to claim 2, wherein
   the relay luminaire that has wirelessly communicated with the at least one luminaire in the second group transmits a communication state between the relay luminaire and the at least one luminaire in the second group to the wireless controller via the first communication unit, and
   the control unit is configured to receive the communication state transmitted from the relay luminaire, and maintain the relay luminaire as such, when the communication state is within a specified range.

10. The lighting system according to claim 2, wherein
   the control unit is configured to (i) transmit a third signal to the relay luminaire via the second communication unit, the third signal instructing the relay luminaire to respond to a request from the wireless controller, (ii) when the relay luminaire does not respond to the third signal, assign at least one other luminaire from the first group as a substitute relay luminaire of the relay luminaire, and (iii) transmit a fourth signal to the substitute relay luminaire, the fourth signal instructing the substitute relay luminaire to wirelessly communicate with the at least one luminaire in the second group via the second communication unit, and the substitute relay luminaire that has received the fourth signal wirelessly communicates with the at least one luminaire in the second group via the first communication unit.

11. The lighting system according to claim 10, further comprising:
a storage unit configured to store intramural layout information including placement information about the substitute relay luminaire and the at least one luminaire in the second group, wherein
the control unit is configured to assign the at least one luminaire as the substitute relay luminaire of the relay luminaire based on the intramural layout information stored in the storage unit.

12. The lighting system according to claim 10, wherein the control unit is configured to assign the at least one luminaire as the substitute relay luminaire of the relay luminaire based on a communication state between the wireless controller and the first group.

13. The lighting system according to claim 10, wherein the control unit is configured to assign the at least one luminaire as the substitute relay luminaire of the relay luminaire based on a number of relayable luminaires in the first group.

14. The lighting system according to claim 10, further comprising:
a power switch for switching on and off a supply of electric power to the relay luminaire, wherein
the control unit is configured to assign the at least one luminaire as the substitute relay luminaire of the relay luminaire from one or more luminaires in the first group to which the electric power is supplied.

15. The lighting system according to claim 10, wherein the control unit is configured to regularly transmit the third signal to the plurality of luminaires via the second communication unit.

16. The lighting system according to claim 10, wherein the substitute relay luminaire that has wirelessly communicated with the at least one luminaire in the second group transmits a communication state between the substitute relay luminaire and the at least one luminaire in the second group to the wireless controller via the first communication unit, and
the control unit is configured to receive the communication state transmitted from the substitute relay luminaire, and maintain the substitute relay luminaire as such when the communication state is within a specified range.

17. A lighting system comprising a plurality of luminaires and a wireless controller, wherein
the plurality of luminaires each include a first communication unit configured to communicate with the wireless controller, and the plurality of luminaires communicate with each other via the first communication units each being the first communication unit,
the wireless controller includes a second communication unit configured to communicate with the plurality of luminaires and a control unit configured to control the plurality of luminaires via the second communication unit,
the plurality of luminaires include a relay luminaire that relays wireless communication of the wireless controller, and a relay-destination luminaire that wirelessly communicates with the wireless controller via the relay luminaire, the control unit is configured to (i) transmit a first signal to the relay luminaire via the second communication unit, the first signal instructing the relay luminaire to respond to a request from the wireless controller, (ii) when the relay luminaire does not respond to the first signal, assign another luminaire as a substitute relay luminaire of the relay luminaire, and (iii) transmit a second signal to the substitute relay luminaire via the second communication unit, the second signal instructing the substitute relay luminaire to wirelessly communicate with the relay-destination luminaire, and the substitute relay luminaire that has received the second signal wirelessly communicates with the relay-destination luminaire via the first communication unit.

18. A wireless relay method of a lighting system including a plurality of luminaires and a wireless controller that communicates with the plurality of luminaires, in which at least one relay luminaire is assigned from the plurality of luminaires, and the plurality of luminaires and the wireless controller wirelessly communicate with one another, the wireless relay method comprising:
transmitting a first signal to the plurality of luminaires, the first signal instructing the plurality of luminaires to respond to a request from the wireless controller;
(i) receiving a response to the first signal sent from at least one luminaire of the plurality of luminaires, (ii) when there is a first group including a luminaire of the plurality of luminaires that has responded to the first signal, and a second group including a luminaire that has not responded to the first signal, assigning the luminaire in the first group as the at least one relay luminaire, and (iii) transmitting a second signal to the at least one relay luminaire, the second signal instructing the at least one relay luminaire to wirelessly communicate with the at least one luminaire in the second group; and
wirelessly communicating between the at least one relay luminaire that has received the second signal and the at least one luminaire in the second group.

19. The wireless relay method according to claim 18, further comprising:
obtaining a communication state between (i) the at least one relay luminaire that has wirelessly communicated with the at least one luminaire in the second group and (ii) the at least one luminaire in the second group; and
maintaining the at least one relay luminaire as such when the communication state obtained is within a specified range.

20. A lighting system comprising a plurality of luminaires and a wireless controller, wherein:
the wireless controller is configured to:
transmit a first signal to the plurality of luminaires, the first signal instructing the plurality of luminaires to respond to the first signal;
receive a response to the first signal sent from at least one luminaire among the plurality of luminaires; and
when the at least one luminaire that has responded to the first signal is in a first group and at least one luminaire that has not responded to the first signal is in a second group, assign the at least one luminaire in the first group as a relay luminaire by transmitting a second signal to the at least one luminaire in the first group, and
the at least one luminaire assigned as the relay luminaire by receiving the second signal is configured to (i) receive a command from the wireless controller via wireless communication and (ii) forward the command to the at least one luminaire in the second group via wireless communication.

\* \* \* \* \*